US012675769B2

(12) United States Patent
Dhesi et al.

(10) Patent No.: US 12,675,769 B2
(45) Date of Patent: Jul. 7, 2026

(54) OPTIMIZED ORDER FULFILLMENT FROM MULTIPLE SOURCES

(71) Applicant: DoorDash, Inc., San Francisco, CA (US)

(72) Inventors: Aman Dhesi, San Francisco, CA (US); Christopher Hollindale, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 101 days.

(21) Appl. No.: 18/904,908

(22) Filed: Oct. 2, 2024

(65) Prior Publication Data

US 2025/0104013 A1    Mar. 27, 2025

Related U.S. Application Data

(63) Continuation of application No. 16/927,662, filed on Jul. 13, 2020, now abandoned.

(60) Provisional application No. 62/874,848, filed on Jul. 16, 2019.

(51) Int. Cl.
*G06Q 10/087* (2023.01)
*G06Q 10/083* (2024.01)

(52) U.S. Cl.
CPC ......... *G06Q 10/087* (2013.01); *G06Q 10/083* (2013.01)

(58) Field of Classification Search
CPC ........................... G06Q 10/087; G06Q 10/083
See application file for complete search history.

(56) References Cited

U.S. PATENT DOCUMENTS

| | | | |
|---|---|---|---|
| 6,384,850 | B1 | 5/2002 | McNally et al. |
| 6,871,325 | B1 | 3/2005 | McNally et al. |
| 6,982,733 | B1 | 1/2006 | McNally et al. |
| 8,146,077 | B2 | 3/2012 | McNally et al. |
| 9,009,060 | B2 | 4/2015 | McNally |

(Continued)

FOREIGN PATENT DOCUMENTS

WO          0122289 A1      3/2001

OTHER PUBLICATIONS

"Civil Action No. 2:23-CV-2165-WSH", Amended Complaint for Patent Infringement—*Ameranth, Inc.*, Plaintiff, V. *Doordash, Inc., Eat'n Park Restaurants, LLC, and Eat'n Park Hospitality Group, Inc.*, Defendants, Sep. 17, 2024, pp. 1-91.

(Continued)

*Primary Examiner* — Florian M Zeender
*Assistant Examiner* — Kimberly S. Bursum
(74) *Attorney, Agent, or Firm* — Kilpatrick Townsend & Stockton LLP

(57) ABSTRACT

The present disclosure generally pertains to systems and methods of order fulfillment using a fulfillment engine, which optimizes the allocation of client or user orders to third party merchants for fulfillment through the use of linear programming or machine learning. This optimization occurs by loading a series of relevant merchant attributes and client attributes into an optimizer with the order and analyzing the attributes to determine an optimal allocation of client orders to third party merchants. These orders are issued to the merchants and where necessary the system arranges delivery of the orders to the client. The system may also automatically update future orders in response to client feedback.

20 Claims, 11 Drawing Sheets

(56) References Cited

U.S. PATENT DOCUMENTS

| | | | |
|---|---|---|---|
| 9,747,651 B2 | 8/2017 | McNally | |
| 9,811,838 B1* | 11/2017 | Daire | G06Q 10/0835 |
| 10,445,683 B1* | 10/2019 | Hession | G06F 16/2228 |
| 10,445,686 B2* | 10/2019 | Mattingly | G01C 21/3453 |
| 10,970,797 B2 | 4/2021 | McNally | |
| 11,276,130 B2 | 3/2022 | McNally | |
| 11,842,415 B2 | 12/2023 | McNally | |
| 11,847,587 B1 | 12/2023 | McNally | |
| 2012/0253908 A1* | 10/2012 | Ouimet | G06Q 30/02 705/26.8 |
| 2013/0151357 A1 | 6/2013 | Havas et al. | |
| 2014/0249937 A1 | 9/2014 | McNally | |
| 2015/0088779 A1* | 3/2015 | Falcone | G06Q 10/083 705/330 |
| 2015/0206224 A1* | 7/2015 | Ouimet | G06Q 30/0251 705/26.7 |
| 2017/0236083 A1* | 8/2017 | Granero | G06Q 10/063 705/7.25 |
| 2017/0364976 A1* | 12/2017 | Watson | G06Q 10/083 |
| 2019/0043370 A1* | 2/2019 | Mulhall | G08G 5/26 |
| 2020/0320470 A1* | 10/2020 | Whitney | G06Q 50/22 |

OTHER PUBLICATIONS

U.S. Appl. No. 16/927,662, Final Office Action, Mailed On Oct. 19, 2023, 14 pages.
U.S. Appl. No. 16/927,662, Final Office Action, Mailed On May 27, 2022, 23 pages.
U.S. Appl. No. 16/927,662, Non-Final Office Action, Mailed On Mar. 26, 2024, 13 pages.
U.S. Appl. No. 16/927,662, Non-Final Office Action, Mailed On Mar. 30, 2023, 17 pages.
U.S. Appl. No. 16/927,662, Non-Final Office Action, Mailed On Sep. 9, 2021, 19 pages.
U.S. Appl. No. 18/145,942, "Unpublished U.S. Patent Application No.", Dec. 23, 2022.
Bonk, "This App Sends You Surprise Food Deliveries", Available online at: https://www.cookingchanneltv.com/devour/2014/03/this-app-sends-you-surprise-food-deliveries, Accessed from internet on Oct. 23, 2024, 13 pages.

* cited by examiner

750 →

Order Confirmation

Tuesday, July 2, 2019

Your order is on its way!

Delivery Address:
    1455 Market St., San Francisco, CA

Delivery Time:
    12:00 pm

Delivery Schedule:
    Tuesdays and Thursdays

Order:
    85 Regular meals; 5 Gluten
    Free Meals; 10 Vegan Meals

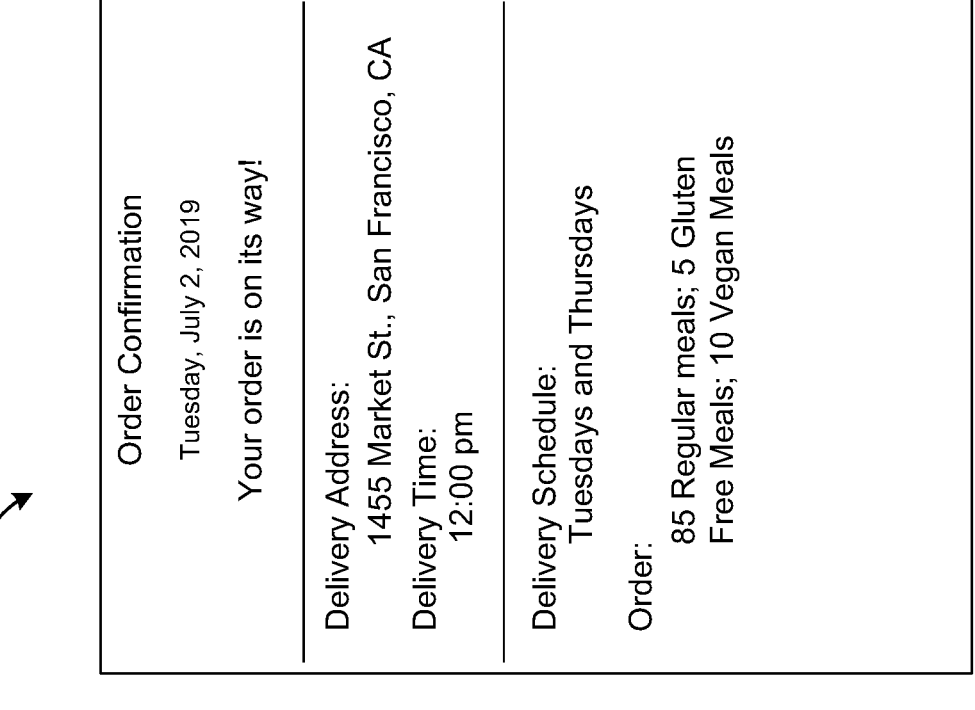

710 — Place Your Order

720 — Delivery Address:
    1455 Market St., San Francisco, CA    Start Date:
    Delivery Time:                        July 2nd, 2019
    12:00 pm 730 — Is this a recurring order?
    ○ Daily    ◉ Weekly (specify days)    ○ One-time

M ☐  T ☒  W ☐  T ☒  F ☐

740 — Order Information:
    NUMER OF MEALS    100

DIETARY
    RESTRICTIONS?

| GLUTEN-FREE | ∨ |        NUMBER    5
    | GLUTEN-FREE |
    | VEGAN |                  NUMBER    10
    | ALLERGEN-FREE |
    | OTHER |

Order                     Cancel

FIG. 7A

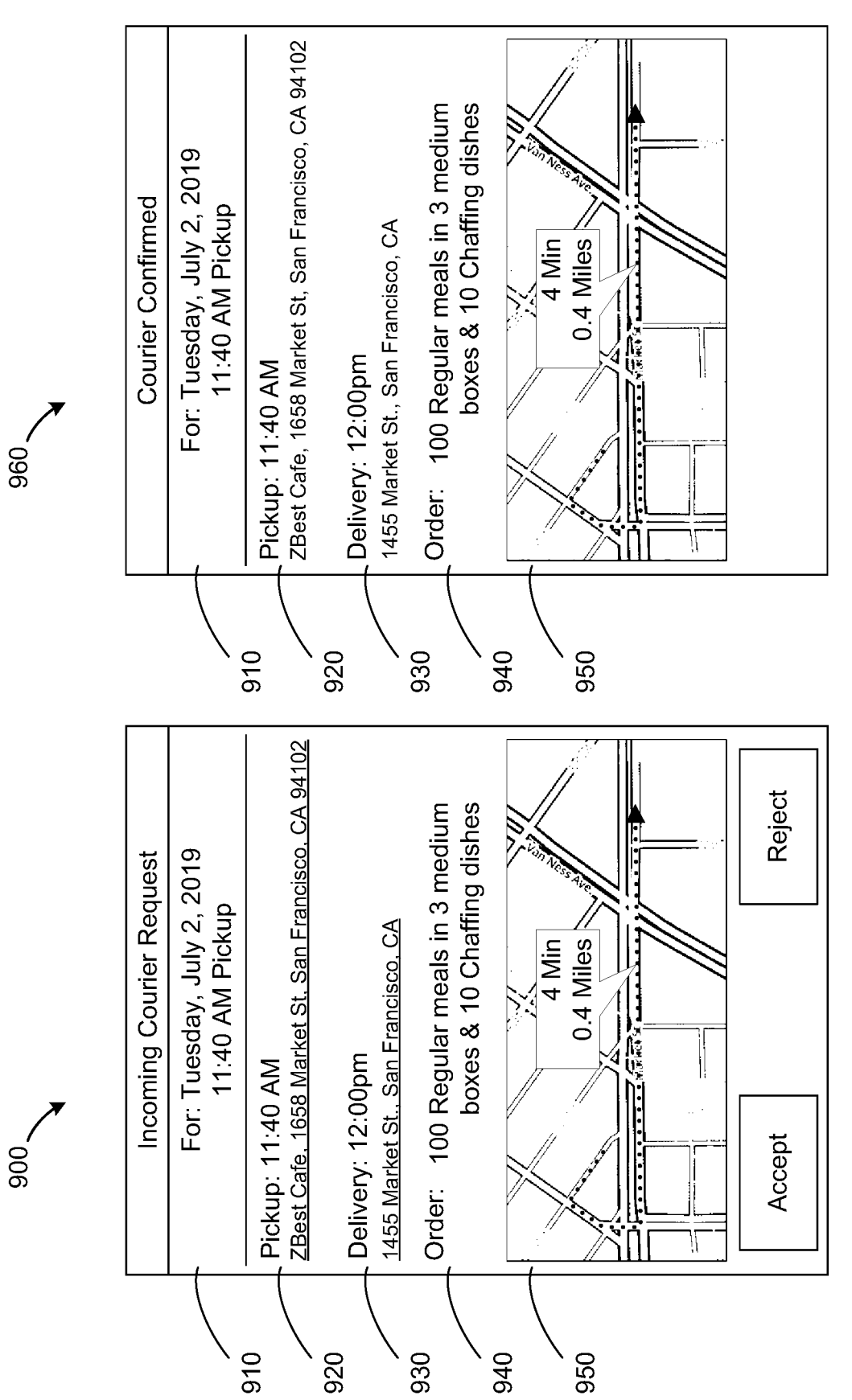

960

Courier Confirmed

For: Tuesday, July 2, 2019
11:40 AM Pickup

910

Pickup: 11:40 AM
ZBest Cafe, 1658 Market St, San Francisco, CA 94102

920

Delivery: 12:00pm
1455 Market St., San Francisco, CA

930

Order:    100 Regular meals in 3 medium
          boxes & 10 Chaffing dishes

940

4 Min
0.4 Miles

Incoming Courier Request

For: Tuesday, July 2, 2019
11:40 AM Pickup

910

Pickup: 11:40 AM
ZBest Cafe, 1658 Market St, San Francisco, CA 94102

920

Delivery: 12:00pm
1455 Market St., San Francisco, CA

930

Order:    100 Regular meals in 3 medium
          boxes & 10 Chaffing dishes

940

4 Min
0.4 Miles

950

Accept          Reject

FIG. 9A

OPTIMIZED ORDER FULFILLMENT FROM MULTIPLE SOURCES

RELATED APPLICATIONS

This application is a continuation of U.S. patent application Ser. No. 16/927,662, filed on Jul. 13, 2020, which claims the benefit and priority of U.S. Provisional Application Ser. No. 62/874,848 filed Jul. 16, 2019, entitled "Optimized Order Fulfillment From Multiple Sources," which are hereby incorporated herein by reference in their entirety for all purposes.

RELATED ART

The ordering of merchandise may take a variety of forms and may use a variety of methods. Examples include the ordering of specific, selected goods from specific, selected merchants by way of websites or apps (such as Amazon, eBay, or the like) or other e-commerce solutions, electronic or print catalogs, wholesale or bulk order, brick and mortar sales, subscription services, phone ordering, or many other examples where a merchant offers a variety of products or services, and the customer may order from among them. For example, when a customer orders a pizza, he or she generally needs to select a restaurant first, choose delivery or pickup, and then specify the size, crusts, toppings, and/or other desired characteristics. Alternatively, a customer may begin with a desired type of pizza, and may later need to search one or more restaurants to determine which, if any, offer the desired meal, compare merchant prices, deals, locations, and the like, and select from among those merchants. In another example, a customer ordering car parts may select a make, model, and type of part and then select which of the compatible parts they wish to purchase and the selected part is provided.

In another example, a customer may place a generic order (or a general category of order) from a particular merchant, where the specific items of the order are curated or selected by the merchant from their inventory. Examples include a "grab bag" of items of specific types from particular merchants, sometimes including some restrictions (e.g., clothes of a particular size and type, leaving the style to whatever the company sends), or subscription services where the customer expects to receive items falling into a particular category or theme from a specific merchant's inventory. Another example is the ordering of a hotel room, where the customer requests certain parameters (e.g., a non-smoking room for one or two persons or may specify one or two beds) and the hotel selects for the customer a specific room meeting the parameters, if available, from a preexisting set of their rooms.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 7A is a client user interface display for placing or modifying of client orders.

FIG. 7B is a client user interface display for confirming the placement of client orders.

FIG. 9A is a courier user interface display for accepting or rejecting of courier transportation orders.

FIG. 9B is a courier user interface display for confirming the acceptance of a transportation order.

Figure 1A:
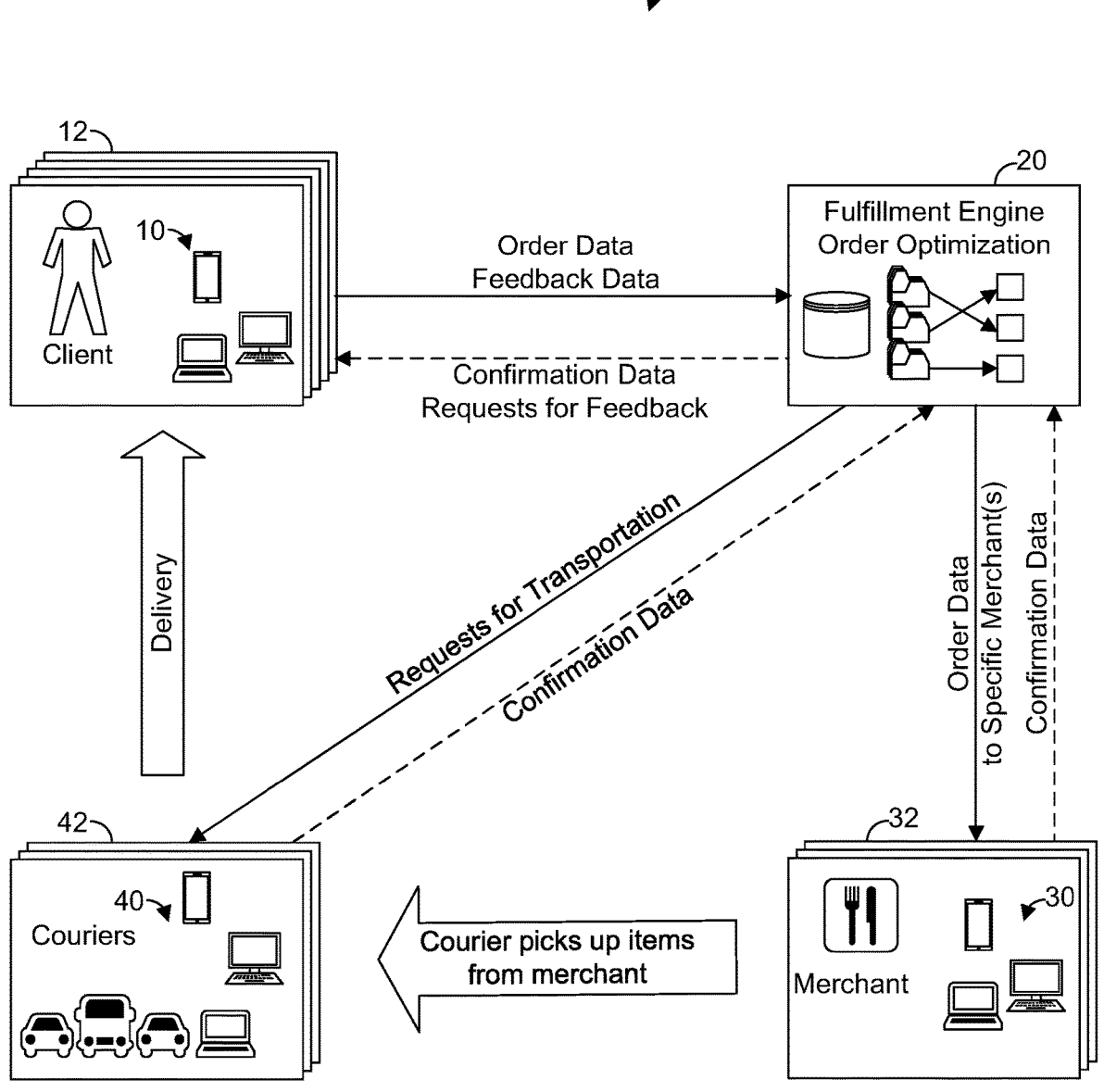
FIG. 1A is a block diagram of an exemplary embodiment of an environment in which a fulfillment engine is used to optimize and fulfill a client order.

In the figures, the left-most digit(s) of a reference number may identify the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure relates to systems and methods for dynamically matching a client with a merchant while accounting for the client's restrictions. In one embodiment, a plurality of merchants offer products or services for sale, and a client submits an order to a service provider for fulfillment without specifying a merchant. A fulfillment engine, having access to client information and merchant information, optimizes a matching of merchant to client, and arranges for fulfillment of the client order. In some embodiments, the service provider that manages the fulfillment engine is a catering service provider that sources products from a variety of merchants, and a client order is a standing (or one-time) order with the catering service to provide a certain number of meals (also referred to herein as "plates") at one or more scheduled times. In some embodiments, the client may pay the catering service provider a predetermined flat fee per meal, and the catering service provider may arrange for fulfillment from one or more merchants, thereby providing a meal (or a component of a meal) at a flat fee, which fee is dependent on the particular merchant.

In some embodiments, the fulfillment engine includes an optimization function that optimizes for one or more of profit margins, customer satisfaction, vendor satisfaction, order quality, and fungibility of order. In its optimization, the fulfillment engine may consider customer data, such as customer restrictions on diet or price and merchant data (e.g., merchant restrictions on product offerings, price, or capacity). In at least some cases, this customer data might not indicate a merchant from which to source one or more items. The fulfillment engine also optimizes for a profit amount or profit margin of the service provider, based on pricing information between the service provider and one or more clients, and between the service provider and one or more merchants. The optimization can additionally apply weight values to one or more factors relating to the customer data, one or more factors applying to the merchant data, and/or profit amount data. In some embodiments, the applied restrictions and/or weighting may change over time between orders. The fulfillment engine may, in advance of or at the time of placing an order, obtain updated source data for the optimization function, re-analyze such data, and adjust an output optimized merchant-client recommendation. In some embodiments, multiple clients may have consistent or inconsistent restriction, price, order, or preference data, and the optimization function may take in the various information for the multiple clients, and output one or more optimized merchant-client relationships for each.

In one embodiment, the fulfillment engine optimizes a merchant-client relation through the application of a linear objective function applying different weights to different factors, such as profit, customer restriction(s), and/or merchant restriction(s). In another embodiment, the fulfillment engine optimizes a merchant-client relation through one or more machine learning algorithms trained in part on past orders placed by one or more clients, where similarities in client, merchant, restriction, cuisine, and the like may exist, and/or on past customer feedback.

In some embodiments, clients (e.g., client companies that have placed or intend to place orders with the service provider, and/or the employees of those companies) may interact with the service provider to input information or receive information via one or more user interfaces. For example, the client may interact with the fulfillment engine through a dedicated app or website, text or phone call by the client or service provider, or any other known method of communication. In some embodiments, merchants may also interact with the service provider via one or more user interfaces (in an exemplary embodiment, different from the user interfaces used by a client) to input information to or receive information from the service provider. For example, the merchant may interact with the fulfillment engine through a dedicated app or website, text or phone call by the merchant or service provider, or any other known method of communication.

In an exemplary embodiment, clients input various restrictions to the service provider, e.g., a catering service provider, including specifying all or some portion of the order needs to conform to various dietary restrictions that may prevent certain restaurants from being selected to fill certain orders. In this example, the catering service provider may charge each customer a fixed price per plate for an order or a set fee for a set number of plates (servings) (which price may vary between each customer). The catering service provider may also contract to pay a set price per plate to each of the merchant restaurants (which price may vary between each restaurant). The allocation of orders to merchants will determine the quality of the food going to each client and the profit for each transaction. With many clients and many merchants (e.g., restaurants), the exemplary embodiment will optimize the allocation of orders to specific merchants in an automated way so as to not require a large number of man hours to figure out this allocation and to allow greater ease and flexibility for updating order allocations based on client feedback.

In some embodiments, the optimization of merchant-client relationships may incorporate feedback, implicit or explicit, received from customers about merchants from which they have received orders. The feedback data may take the form of starred ratings, numerical ratings, one or more survey fields, or any other structured value. Additionally or alternatively, the feedback may take the form of unstructured data such as freeform text reviews that are analyzed by any known natural language processor to obtain feedback on the client's experience, and the party (e.g., restaurant, courier, retailer, etc.) to whom the feedback is directed. Client feedback can be used by the fulfillment engine to optimize future orders from the client. In some embodiments, the feedback may be used to make changes to existing orders that have not been delivered.

In some embodiments, the fulfillment engine uses customer preferences to choose between equally (or similarly) suited merchants. These preferences may include, e.g., a preferred cuisine, a preferred restaurant, a preferred dish, or any other preferred qualifier that may be assigned to a merchant and/or its product offerings. Some embodiments may assign a weight to one or more preferences to be used in optimization. In an exemplary embodiment, a client preference is weighted less heavily than a client restriction, a merchant restriction, merchant availability, or other restrictions, however, alternate embodiments may exist where customer preferences may be weighted more heavily or equally. In some embodiments, a client preference may be ignored, discarded, or weighted to be non-contributory to the optimization in a case that one or more other factors (such as client restrictions, merchant restrictions, profit margins, or any other factor) contradict a client preference.

In some embodiments, the fulfillment engine may consider, in the optimization function, a fulfillment variety. That is, the fulfillment engine may not match a client with the same merchant more than a predetermined number of times within a time period. The fulfillment engine could also consider product categories, assigning merchants one or more categorical designators, and optimizing for variety between categories. For instance, where the merchants are restaurants or food providers, a merchant may be assigned or labelled as providing one or more categories or genres of cuisine (e.g., Mexican, Italian, etc.), and a merchant with an assignation similar to that of a merchant previously (or recently) paired with the client might be less favorably considered with regard to the variety factor.

In some embodiments, a fulfillment engine may average ratings of the various employees of the client to obtain an overall score for a particular merchant, which score may be factored into the merchant-client relationship optimization. In other embodiments, a fulfillment engine might not collect numerical, starred, or other types of ratings from clients, but instead, may generate scores (e.g., numerical scores) based on one or more other types of client feedback (e.g., written feedback, survey, thumbs up/down, likes, indications of whether the client would order again, etc.). In still other embodiments, the ratings use may be optional or not used at all.

In one embodiment, the output of the optimization function is an optimized (or "best") relationship of a single merchant and a single client. In an alternate embodiment, the output of the optimization function is a set of one or more ordered or ranked tuples, each representing a merchant-client relationship, where higher ranked or scored relationships are considered more optimal. In other embodiments, where multiple clients have orders to be fulfilled, the output of the optimization function may be an optimized merchant-client relationship (or a ranked or ordered set of relationships) for each of the relevant clients requiring order fulfillment.

In some embodiments, after obtaining an optimized merchant-client relationship from the optimization function, the fulfillment engine may arrange for fulfillment of a client order from the merchant specified in the optimized relationship. In an exemplary embodiment, the fulfillment transmits the order to the merchant and requests confirmation of availability. Upon receiving confirmation, the fulfillment engine may place the order with the merchant. The order may be fulfilled by the merchant or by a third party courier service (or similar), such third-party fulfillment being arranged, in some embodiments, by the fulfillment engine, or alternatively, by the merchant independently. In some embodiments, the fulfillment engine may consider, at the time of optimization, the necessity for a third-party courier service, and may factor data about such service (e.g., cost, delivery time adjustment, availability of courier, relationships between merchants and couriers, etc.) in performing its optimization.

In still other embodiments, a client may place an order with a catering service that requires the assignment of two merchants to fulfill the order. For instance, where a meal has two distinct components, the fulfillment engine may perform two optimizations, one to obtain a first optimized merchant-client relationship for a first item of the order A, and one to obtain a second optimized merchant-client relationship for a second item of the order B, though other embodiments may have any number of components. The fulfillment engine may then arrange for fulfillment of the first item and fulfillment of the second item from different respective merchants. Such a scenario may be triggered, for example, in a case where no single merchant meets all the customer requirements.

While many examples disclosed herein are directed to catering and food services perspectives the techniques described herein may easily applied to many other forms of order fulfillment in both the retail and wholesale worlds both in serving end customers or other companies and businesses. Some examples of other retail order fulfillment includes clothing, book, music, movie, and novelty orders. Additionally ordering office supplies, cleaning supplies, building materials, and so forth may be examples of wholesale order fulfillment. In each of these examples, the preferences and the restrictions of the client would change to be suitable for the general field of purchases (e.g., client restrictions for clothing purchases might include sizing information, fabric restrictions, and so forth). Returning to the catering examples, in some embodiments, some or all of these merchants are restaurants, groceries, caterers, or other food service merchants and a customer is an entity, individual, group, or organization that has authorized a fulfillment engine to order a number of meals from one or more merchants, subject to a customer's restrictions on, e.g., price, food restrictions, delivery time, etc. In one embodiment, the fulfillment engine may be managed by an entity engaged in outsourced catering. Some or all of the clients may be companies that use catering for a variety of reasons such as special events for clients or employees, parties, and at times regular company meals. Planning and organizing such events can take a lot of time and effort for company employees, selecting between a variety of different providers; checking the provider's ratings and reviews; checking the provider's menus to ensure they can provide for any special dietary needs of their employees; and arranging delivery to the company at the right time. Accordingly, the systems and methods described herein simplify this process by saving companies the resources associated with these activities.

As one example, a startup company of X employees might hire a catering service provider to feed its employees. The company may sign a contract with the catering service for a standing order to provide a specified number (e.g., Y) of meals to the company at a predetermined frequency (e.g., per day, per week) at a particular time. In some examples, the company may also provide details regarding any dietary restrictions. After receiving this information, the catering service provider may decide what meals to provide to the company, that is, by running an optimization function to determine a particular merchant and product that will meet the client requirements and/or restrictions. The catering service provider may outsource the company's meal fulfillment to the merchant(s) (e.g., restaurants) and/or one or more third-party couriers. In a scenario where the client has requested meals daily, for a week, the catering service provider will plan the orders for week. This may require, e.g., needing some number of meal orders filled on Monday, another number of orders filled on Tuesday, and so forth. The catering service provider will then determine to fulfill the each day's orders from a set of available restaurants (e.g., 50 restaurants) in that particular area. This takes the burden off the company for having to plan the menu for the various days.

In some embodiments, the client company (either through individual employees, a single value, a subset of employees, or aggregated or collected sets of data) may provide feedback, such as through freeform/non-structured character entry, ratings (e.g., stars, or numerical, or the like), likes/dislikes, indication of willingness to order again, etc. The catering service provider may use all of that feedback data coming in from the particular company to decide (in the optimization function) what meals should be sent to the company in the future.

Consumers shopping in various marketplaces have different needs and desires that may change over time and due to various situations. The process of ordering in these conventional solutions requires a customer to make several decisions and selections related to their order, a process that may be arduous or time consuming. Additionally, there may be times that customers are looking for specific products to fulfill specific needs and other times that customers are merely looking for a general product in a class of products that meet a set of requirements. Fungibility of products may occur in the latter instance, when the customer does not know exactly what they want and/or when they might not care specifically what they receive as long as it meets their specified requirements (e.g., a threshold quality, size, or other characteristics). For example, book and music clubs might send a relatively randomized selection of books or music to a customer interested in being exposed to new things, while observing customer restrictions (e.g., to include or exclude a certain genre). In another example, a customer might want tacos but may not care which of the top 50 taco providers in the area provide the tacos as long as they are of a good quality. Alternatively, customers might want variability, surprises, or unique items, to avoid repetition or convention with, e.g., clothes, food, and the like. Some solutions serve a client's needs with the resources of a single entity (e.g., by stocking and maintaining a warehouse of products), however, such solutions may lead to issues of scalability. To address this, some solutions may outsource work to other reputable merchants. However, such solutions may not be able to handle vague or undirected requests that do not specify a target source and/or product. Further, traditional solutions may see increases of complexity in managing customer-merchant relationships as numbers of customer, orders (e.g., order frequency and amount), and/or merchants increase.

Situations in which fungible needs or products are available from a number of quality sources, determining which sources and products are sent to which clients can be a difficult process. Random selection can be an easy solution but random selection does not take into account profitability, customer satisfaction, or merchant satisfaction. What is needed is a method to optimize the allocation of orders to providers that optimizes profit, customer satisfaction, and vendor satisfaction in a way that can easily handle changes in customer requirements and restaurant capabilities. A method that automates and simplifies the sending of a variety of orders to a variety of vendors for fulfillment. Additionally it would be helpful to maintain relationships with a variety of vendors ensuring that the allocations allow each vendor to receive a minimum level of orders/business. To maintain maximum profit and customer satisfaction, a subset of the vendors often become preferred for a various subsets of customers and therefor become prioritized. When hundreds or even thousands of different orders that need to be satisfied by tens, hundreds, or even thousands of different vendors the complexity of proper allocations of orders to vendors increases geometrically as the numbers of customer, orders, or vendors increase. This complexity is too much to be handled manually with pen and paper or in people's minds. Additionally, continuously updating these allocations in the face of changing user requirements, preferences, and feedback can increase the allocation complexity immensely. When numerous orders need to be fulfilled weekly, daily, or even multiple times a day, the complexity of the problem grows even more convoluted.

The systems and methods described herein provide improved order processing and fulfillment, which handles the aforementioned complexity allocating fungible orders to various merchants in a manner that, optimizes profit, customer satisfaction, and/or vendor satisfaction. The system and methods can automatically handle changes in customer requirements and restaurant capabilities and updates based on user ratings, and thereby significantly increase the scalability of customer-merchant allocation.

Turning now to the figures, FIG. 1A is a block diagram of an exemplary embodiment of an environment 100 in which a fulfillment engine is used to optimize and fulfill a client order. Environment 100 may include one or more client systems 12, one or more merchant systems 32, and a fulfillment engine 20. Environment 100 may also include one or more courier systems 42, for order fulfillment between the merchant systems and client systems. Any number of merchant systems, client systems, and/or courier systems may be operated in the environment 100 however, for ease of illustration, the details of a single merchant system 32, a single client system 12, and a single courier system 42 are illustrated in FIG. 1A.

FIG. 1A illustrates one or more client systems 12 (also referred to herein as clients or customers), each using at least one client device 10. The term "client" may refer to a group, organization, company, individual, or any other entity that may use the services of a service provider that manages or controls the fulfillment engine 20 to purchase a product or service, or may be potentially interested in purchasing a product or service. In the illustrated embodiment, a client 12 is a company or other organization with one or more employees. The one or more clients 12 may wish to place a catering order from a fulfillment engine 20, where the order does not specify a particular source for the items in the order.

Clients 12 may send information to and receive information from other components of environment 100 by means of a client device 10. Client device 10 may be, for instance, a mobile device such as smart phone, tablet, computer, laptop, or other electronic device that can communicate via a network (not specifically shown). In some embodiments, fulfillment engine 20 may present a user interface (e.g., a graphical user interface) to a client device 10 through which the client may interact with the fulfillment engine. Such a user interface may be a dedicated application (app) or website, email, instant messaging, or other type of electronic communication, or via voice, SMS, voicemail, or any other appropriate type of communication. In some embodiments, the client 12 may interact indirectly with the service provider via a mobile or other software application, such as an e-mail, messaging, or social media application. The fulfillment server 20 may later obtain information about the client's interactions. In some embodiments, the client 12 may enter information through user input via a keyboard or keypad (whether mechanical, membrane, visual (displayed), tangible or intangible), stylus input, verbally through voice recognition tools, or touchscreen/touchpad.

In an exemplary embodiment, client 12 has a standing relationship with the service provider in which the client has preordered a number of products to be delivered at predetermined times or regular intervals, though other embodiments may involve one-time purchases. In this embodiment, the client's order does not specify any particular items that make up the order, but instead may merely specify restrictions on those items, that is, conditions around delivery of the items (such as quantity or cost), and/or what the items should not be. In an exemplary embodiment, these restrictions are limited in nature, defining features that contribute against (or prohibit) a particular pairing of a restaurant and a client. To illustrate, a client may be a corporation placing orders with a catering service provider. In one example, a client's order could be for a single meal, a set of meals, or a set number of entrees, sides, and/or desserts. The order could be for one date and time, multiple times on one day, a series of dates and times, and/or on a recurring or periodic basis. The number of meals and the time of delivery each act as unique restrictions on the client's order—that is, conditions that must be met by the service provider. Orders may include dietary restrictions for example requiring a specified number of at least one or more meals be provided which are gluten free, vegan, allergen free, kosher, or halal meals or some combination thereof. However, in the exemplary embodiment, the order does not specify where the meals should be sourced from or what the actual content of the meals must be. This is simply one example, of course, and other implementations may exist in different embodiments.

The client device 10 may transmit this order to a fulfillment engine 20. In an exemplary embodiment, fulfillment engine 20 is managed, operated, or facilitated (and/or in some embodiments, owned) by a service provider. In some embodiments, the service provider may be a caterer or another catering entity. Fulfilment engine 20 is capable of communication with any number of client devices 10, any number of merchant devices 30, and any number of courier devices 40, and in some embodiments other third-party entities, in a manner described in greater detail below.

FIG. 1A illustrates one or more merchant systems 32 (or merchants 32), each using at least one merchant device 30. The term "merchant" (also referred to herein as a vendor or seller, or in some exemplary embodiments, a restaurant) may be understood to encompass any business or other entity that sells, leases, or otherwise provides physical goods or services to one or more customers. For purposes of explanation, one type of merchant 32 may be a restaurant (brick and mortar or food truck), grocery, bakery/specialty store, wholesale food supplier, vending company, farm stand or independent supplier, or any other food supplier, though other embodiments are not limited to any particular product, service, or type of industry.

A merchant 32 may send information to and receive information from other components of environment 100 by means of the merchant device 30. Merchant device 30 may be, for instance, a mobile device such as a smart phone, tablet, computer, laptop, or other electronic device that can communicate with the fulfillment engine via a network (not specifically shown). In some embodiments, fulfillment engine 20 may present to a merchant device 30 a user interface (e.g., a graphical user interface) through which the merchant may interact with the fulfillment engine 20. Such a user interface may be a dedicated app or website, email, instant messaging, or other type of electronic communication, or via voice, SMS, voicemail, or any other appropriate type of communication. In some embodiments, the merchant may interact indirectly with the service provider via a mobile or other software application, such as an e-mail, messaging, or social media application. The fulfillment server 20 may later obtain information about these interactions. In some embodiments, the merchant may enter information through user input via a keyboard or keypad (whether mechanical, membrane, visual (displayed), tangible or intangible), stylus input, or touchscreen/touchpad.

FIG. 1A further illustrates one or more courier systems 42, each using at least one courier device 40, which may be, for instance, a smart phone, tablet, computer, laptop, or other electronic device that can communicate with the fulfillment engine via a network (not specifically shown).

It will be understood that while, for illustrative purposes, FIG. 1A illustrates the details of only one client system 12, one merchant system 32, and one courier system 42, any number of client systems 12, merchant systems 32, or courier systems 42 may be variously connected in different embodiments. In various implementations, any number of merchant devices and any number of client devices may be used in any number of configurations.

Fulfillment engine 20 transmits and/or receives order data, profile/preference data, fulfillment data, and/or feedback data, etc. to/from one or more of merchant devices 30 and customer devices 10 (such transmissions shown in FIG. 1A with solid lines). These types of data transmission are performed over a communication network (not specifically shown). The communication network may comprise one or more network types, such as a wide area network (such as the Internet), a local area network (such an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the network may be the Internet and payment and information may be communicated between system components in an encrypted format such by a transport layer security (TLS) or secure socket layer (SSL) protocol. In addition, when the network is the Internet, the components of the may use the transmission control protocol/Internet protocol (TCP/IP) for communication. In various embodiments, one or more of client systems 12, courier systems 42, and merchants 32 may be entities separate from fulfillment engine 20.

Figure 1B:
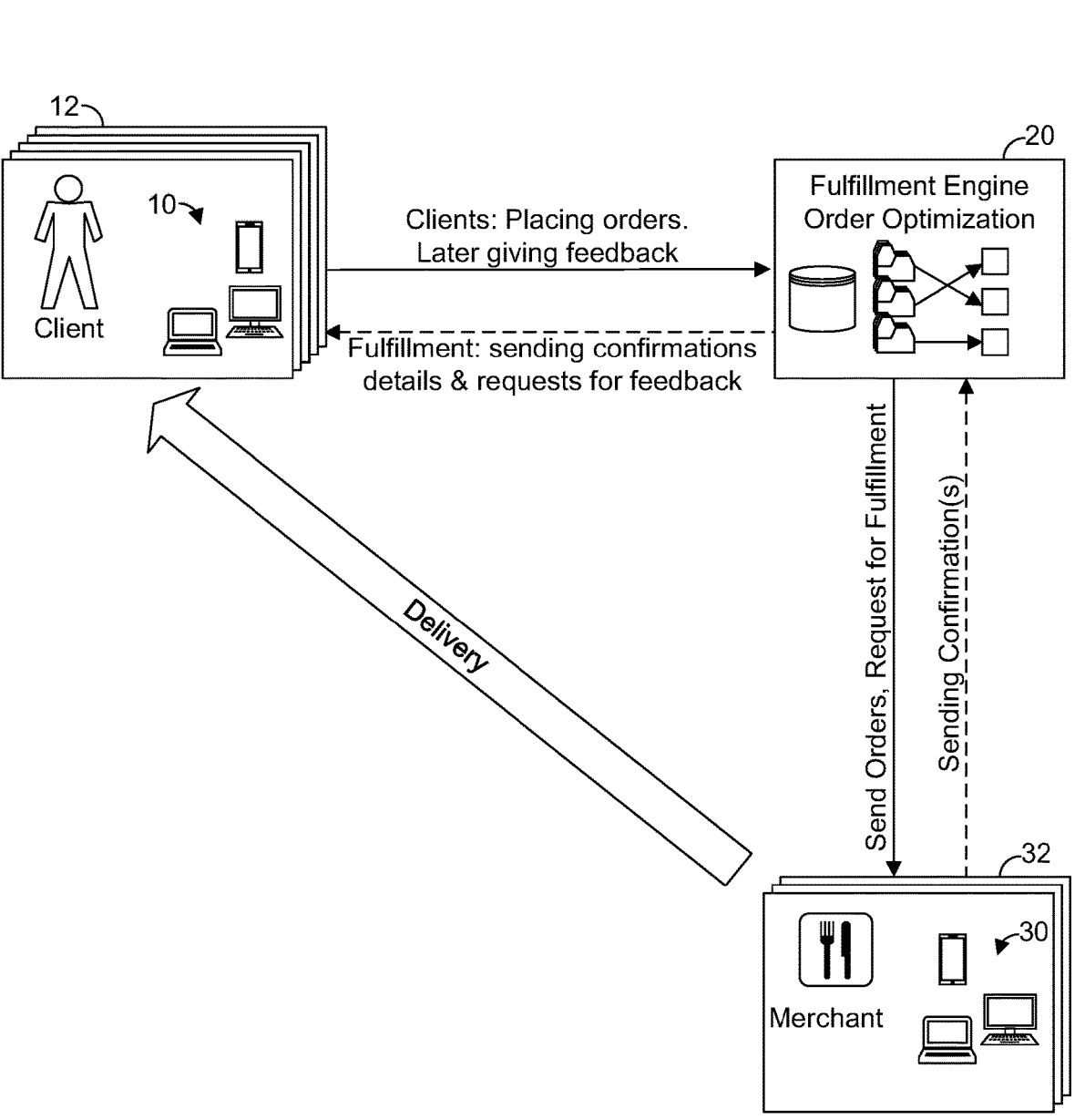
FIG. 1B is a block diagram of an exemplary embodiment of an environment in which a fulfillment engine is used to optimize and fulfill a client order.

FIG. 1B illustrates an alternate embodiment similar to FIG. 1A, except that no courier system 42 is used for fulfillment or delivery, and rather, those fulfillment features (described in greater detail below) are managed or performed by the merchant 32 or client 12.

In the illustrated example of FIG. 1A, the fulfillment engine 20 would load information regarding area merchants and optionally courier availability along with the order into an optimizer to select an optimal merchant 32.

In some embodiments, a courier 42 may be contacted for delivery in a case where their current location falls within a proximity range of a merchant that allows for fulfillment via delivery. In particular, in an exemplary embodiment, couriers 42 each may hold a respective courier device 40, which may communicate with the fulfillment engine 20. The fulfillment engine 20 sends orders out to the optimal merchants 32 and couriers 42, which may send confirmations of receipt of orders and/or their availability for fulfillment back to the fulfillment engine 20 (optional confirmations shown with dotted lines). In some embodiments, the courier 42 contacted by the fulfillment engine 20 is also determined by the optimization function, that is, an optimal courier 42 is selected for the particular fulfillment required. That optimal courier 42 can then pick up the requisite ordered items from the merchant 32 and deliver the ordered items to the client as instructed by the order (shown with larger arrows for potentially delivering physical product(s) or service(s)).

Figure 2A:
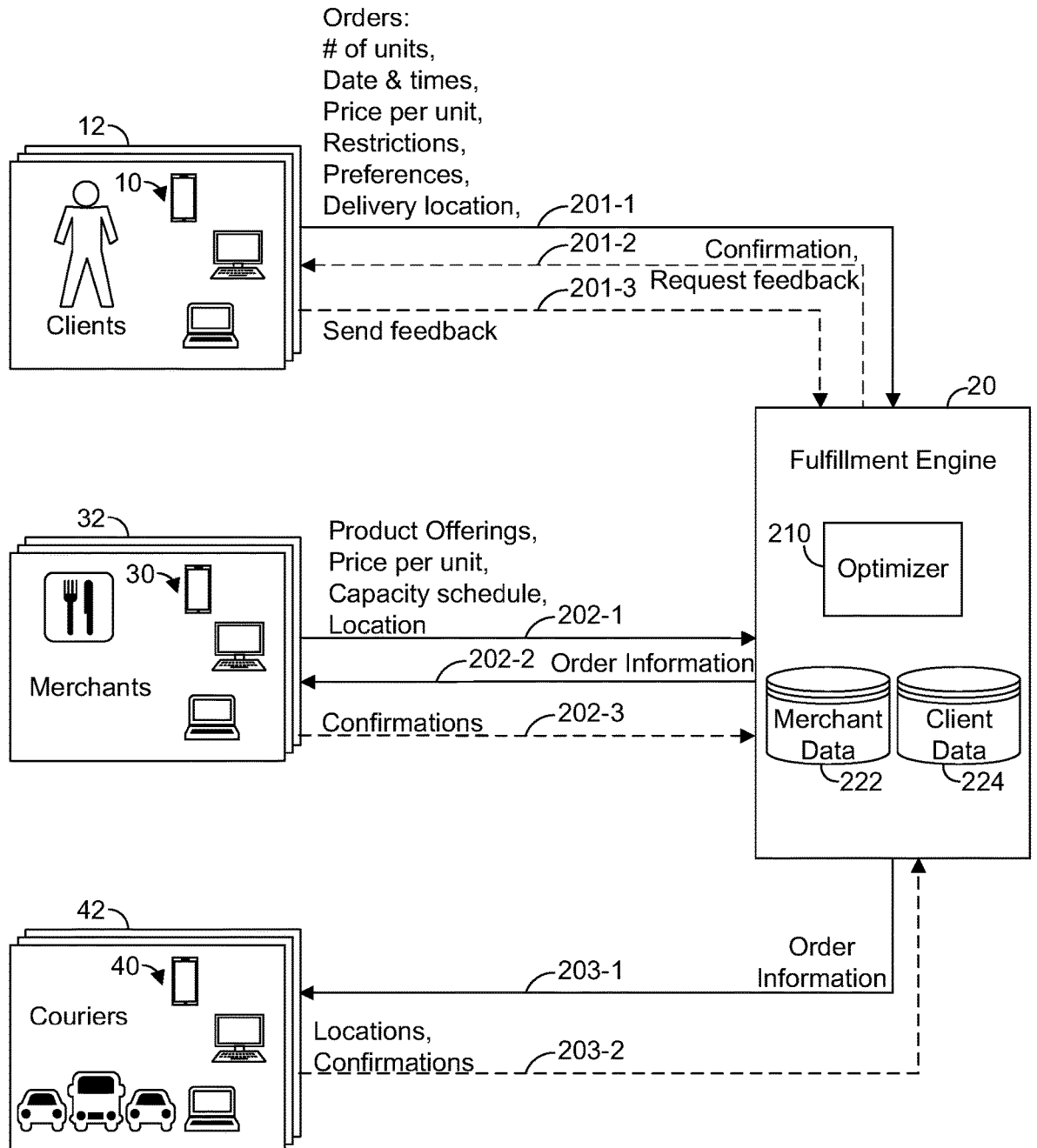
FIG. 2A illustrates the flow of information in an ordering process through an exemplary fulfillment engine.

FIG. 2A illustrates the flow of information in an ordering process through an exemplary fulfillment engine 20. FIG. 2A shows additional details about the communications between the clients 12, merchants 32, and couriers 42 with the fulfillment engine 20.

Client 12, via device 10, may send one or more orders 201-1 to a fulfillment engine 20. An order may include information such as the number of meals to deliver, the dates and times of deliveries, the amount to be paid per meal (i.e., pricing information), restrictions including dietary restrictions or providers to avoid, preferences, delivery location, delivery instructions, and/or payment information, or any subset thereof. Pricing information may include price per unit, and/or max cost for the whole order. In one example, one unit could be a product such as a meal or one of any other good or service, and an order may consistent of one or more units. Payment information may be information related to a payment device (e.g., a device that is capable of communicating with one or more interfaces of payment reader, such as a card having a magnetic strip or having an EMV chip (e.g., a credit or debit card, a gift card, a proxy card associated with at least one financial account, etc.), or a NFC- or Bluetooth-enabled electronic device such as a smart phone running a payment application, though other types of payment devices may be used in other embodiments).

In some embodiments, this information, or any subset of this information, may only need to be entered upon a previous order or registration of the user with the system of a service provider. The information may be stored in one or more client data databases 224 (described in greater detail below) of the fulfilment engine 20 so as to be later accessible by the fulfillment engine 20 and its optimizer 210 (described in greater detail below) without needing to be sent with the client's order. However, other embodiments may exist where the client 12 may send such information prior to each order, for example, in scenarios where the client's needs and/or restrictions have changed. In some embodiments, the fulfillment engine 20 will send confirmation messages 201-2 to the client device 10 to confirm that their order information 201-1 has been accepted. These confirmation messages 201-2 may include information such as the content of the order selected by the fulfillment server, the merchant selected to fulfill the order, a time when the client should expect their orders to be delivered (estimated time of arrival)

(in some embodiments, this may be omitted where the delivery time is before or at the client's requested delivery time), tracking information, in some instances including courier name, contact information, etc., and so forth. In some embodiments, the confirmations and requests for feedback are not needed or optional, and are shown with dotted lines.

Merchant 32 may use device 30 to send or otherwise inform the fulfillment engine 20, in a transmission 202-1, of information such as the merchant's catalog or product offerings, per unit price, location, and capacity schedule (e.g., capacity min/max or other restrictions, among other things). The catalog or product listings can indicate what options are available including information that would allow the fulfillment engine 20 to tell if the merchant 32 can fulfill a client's order.

In some embodiments, this information, or any subset of this information, may only need to be entered upon a first sign-up of a merchant with the system of a service provider, or at periodic intervals or only when such information has changed. In such embodiment, the information may be stored in one or more merchant data databases 222 (described in greater detail below) of the fulfilment engine to be later accessible by the fulfillment engine 20 and its optimizer 210 (described in greater detail below). For example, the catalog may include a menu and/or indications of what meals meet certain dietary restrictions. In other embodiments, the menu may contain other indications or cuisines or categories associated with particular menu items, indications of whether the item is in short supply (and/or what that supply is), whether the item may take additional time for delivery, whether the item is limited addition or seasonal, or any other appropriate information. In other embodiments, rather than directly receive a catalog from the merchant, the service provider and the merchant 32 may pre-negotiate products and/or prices that the merchant is capable of meeting, and such information may take the place of (or in some instances supersede) any similar information sent in transaction 202-1. The capacity schedule sent in transmission 202-1 provides information that allows the fulfillment engine to know how much product the merchant is able to provide on various days. The catalog or capacity schedule can indicate how much lead time are needed for orders.

After entering the information provided in transmission 202-1 (along with other information) into the optimizer 212 in a manner described in greater detail below, the fulfillment engine may decide to assign the merchant to fulfill one or more client orders. The fulfillment engine 20 sends order information 202-2 to the merchant device 30 corresponding to the merchant 32 that the fulfillment engine 20 deems optimal for fulfilling the client's order. This determination is done by way of an optimizer algorithm 212, which will be discussed later in greater detail. In an embodiment where the service provider is a catering service provider and the client has requested the delivery of one or more meals, the fulfillment server 20 may focus solely on merchants proximate to the client to ensure that the meal is prepared and delivered in a relatively quick timeframe required by the meal, filtering out, discarding, and/or otherwise disfavoring merchants from fulfillment of an order where they are at a location deemed to be too far from or non-proximate to the client.

The proximity between merchants and the client may be determined by the fulfillment engine 20 based on, for example, a shared location (such as a city, neighborhood, zip code, campus, and/or geographic area), a calculated or estimated relative travel distance between the two (in meters or kilometers), a calculated or estimated relative travel time between the two, one or more physical distance thresholds, or any other appropriate measurement. The merchant will in some embodiments send confirmation messages 202-3 to the fulfillment engine 20 to confirm its receipt of order information. In some embodiments, where the merchant is a mobile merchant such as a food truck or is performing its own delivery (e.g., via a delivery van or truck), the confirmation 202-3 may contain information sufficient to identify a location of the merchant vehicle (such as, e.g., data from a device transmitting a beacon or signal (or, in other embodiments, a GPS receiver or another type of device). In other embodiments, location information may be separately or periodically sent to the fulfillment server 20, to the client device 10, or to another server (not shown) that may track or aggregate location data, etc. In some embodiments, the merchant 32 may not be committed to fulfillment of all of fulfillment engine 20's orders and may instead actively accept order(s) or deny order(s) based on whether, e.g., an order is impracticable or undesirable to the merchant. Accordingly, the confirmation 202-3 may include an acceptance of the order from the client (that is, a confirmation of commitment to fulfil) and/or an indication of availability.

Orders may be fulfilled in a variety of ways, typically delivery by the merchant to a client location or delivery by third-party couriers to a client location. In other embodiments, fulfillment may take the form of one or more of pick up by the client from a merchant location, storage or temporary holding facilities, or may involve other third-party entities to provide alternate possible fulfillment methods. In cases where the order is not for pick up and the merchant 30 does not handle delivery themselves, fulfillment server may requisition one or more couriers 42 (by providing order information to one or more courier devices 40). Couriers 42 may be requisitioned to pick up all or a subset of the products making up the client order, from a location of the fulfilling merchant, and deliver them to the client 10. Couriers 42 may indicate the areas they deliver and their availability schedule. In this case, the fulfillment engine 20 will send order information 203-1 to an optimal courier 40 and the courier 40 will send a confirmation 203-2 to the fulfillment engine 20. In some embodiments, the confirmation 203-2 may contain information sufficient to identify a location of the courier 42 (such as, e.g., data from a device transmitting a beacon or signal (or, in other embodiments, a GPS receiver or another type of device). In other embodiments, location information may be separately or periodically sent to the fulfillment server 20, to the client device 10, or to another server (not shown) that may track or aggregate courier location data, etc. In some embodiments, the courier may actively accept the order or deny the order based on whether, e.g., the order is impracticable or undesirable to the courier, in which case the confirmation 203-2 may include an acceptance of the order from the client (that is, a confirmation of commitment to fulfil) and/or an indication of availability.

Figure 2B:
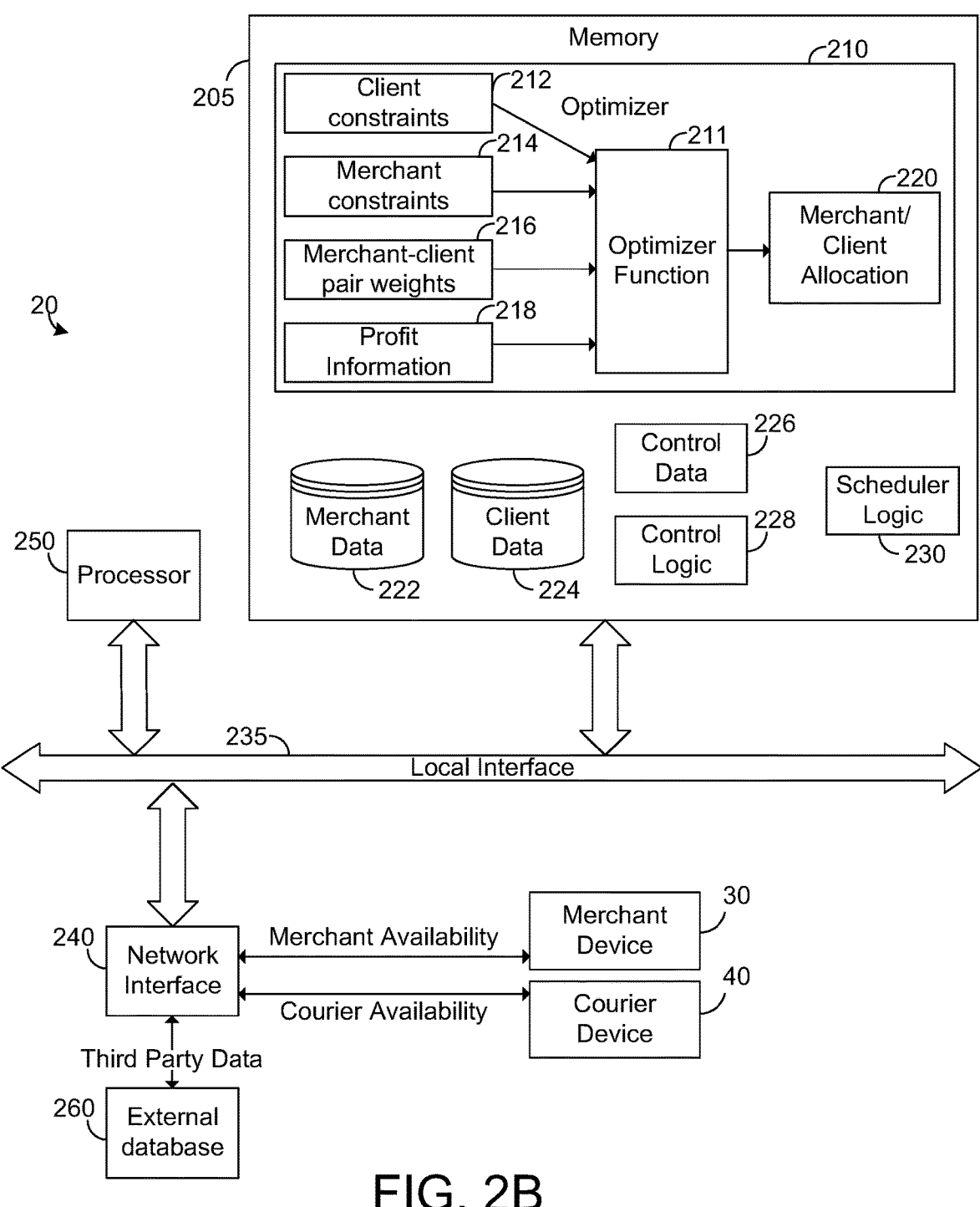
FIG. 2B is a block diagram of select components of an exemplary fulfillment engine.

FIG. 2B is an exemplary schematic diagram of certain components of a fulfillment engine 20 in accordance with some embodiments of the present disclosure. The fulfillment engine 20 may include a memory 205. As used herein, memory 205 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 205 may store instructions used in the systems and methods described herein. While FIG. 2B illustrates a single discrete memory 205, it will be understood that the embodiments described herein are not limited to any particular arrangement. Other embodiments may store information in one combined memory, or with information stored in a different configuration in one or more memories, some local to the other components illustrated in FIG. 2B and/or some shared with, or geographically located near, other computing systems.

The exemplary fulfillment engine 20 depicted in FIG. 2B may be executed by one or more processors 250, such as a central processing unit (CPU), digital signal processor, other specialized processor or combination of processors, or other circuitry that communicates to and drives the other elements within the recommendation system via a local interface 235, which may be implemented by a system bus. As an example, a processor 250 may execute instructions of software stored in memory 205. While FIG. 2B illustrates one processor 250 which implements all of the various logics in the fulfillment engine 20, it is possible in other embodiments for the engine 20 to employ multiple processors. In some embodiments, the processing of engine 20 is not limited to being performed by a processing element connected to the local interface 235, but instead, processing may be distributed over one or more computer systems that may be remotely located. In some embodiments, the processor 250 may comprise an artificial neural network or other type of configuration for performing machine learning functions based on instructions stored in memory 205.

Fulfillment engine 20 may include a network interface 240 may have access to one or more third-party merchant availability databases 250 and courier availability databases 260 through which availability may be queried and orders may be placed. This access may be wired or wireless and may be made through one or more networks including the Internet.

The illustrated embodiment depicts a number of modules stored in the memory 205, specifically, optimizer 210, control logic 228, and/or scheduler location 230. These depicted modules may variously represent one or more algorithms, computational models, decision making rules or instructions, or the like implemented as software code or computer-executable instructions (i.e., routines, programs, objects, components, data structures, etc.) that, when executed by one or more processors, program the processor(s) 250 to perform the particular functions of their respective logic. It may be understood that these modules are depicted in FIG. 2B as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof. The capabilities of these various logics are described in greater detail below. Further while each of the above-mentioned modules is depicted in FIG. 2B as being part of fulfillment engine 20, these components need not be so configured, and in other embodiments, other configurations of the various components, within fulfillment engine 20 or distributed over one or more computing systems, are possible. Optimizer 210 (and the components thereof), control logic 228, and/or scheduler logic 230 can be variously implemented in software, hardware, firmware, or any combination thereof. In the exemplary embodiment of FIG. 2B, the various logical components are implemented in software and are stored in memory 205. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus, e.g., read-only memory, random-access memory, flash memory, hard disks, etc. In some examples, the specific algorithms or instructions configured to perform the functions of the logical components depicted in FIG. 2B are not executed locally to the engine 20, but rather, may be provided to the fulfillment engine 20 for execution through the use of one or more software development kits, which may include, e.g., one or more application programming interfaces (APIs), web APIs, tools to communicate with embedded systems, or any other appropriate implementation.

Memory 205 may, in some embodiments, include one of more databases or data repositories, including but not limited to merchant data 222, client data 224, and control data 226. The optimizer 210, scheduler logic 230, and/or control logic 228 stored in memory 205 may read data from or write data to the client data database 224 and the merchant data database 222 as part of their respective calculations. Data read from the repositories may include, among other things, client constraints 212, merchant constraints 214, merchant-client pair weights 216, profit information 218, merchant/data allocation 220. In other embodiments, any or all of client constraints 212, merchant constraints 214, merchant-client pair weights 216, profit information 218, merchant/data allocation 220 may not be stored in the databases 222, 224, 226, but instead may be stored in a different data repository, such as a cache, or at another local or remote storage location. It will be noted that while the terms "database," "repository," or "storage" are variously used with reference to systems 205, 212, 214, 216, 218, 220, 222, 224, and/or 226, these components are not so limited nor is any particular form or configuration of data storage mandated, and the described "databases" may alternatively be an indexed table, a keyed mapping, or any other appropriate data structure. In an exemplary embodiment, memory 205 and engine 20 as a whole are managed by the service provider so as to be connected to a local network. In addition, optimizer logic 212, control logic 228, and/or scheduler logic 230 may access one or more external databases(s) 260 managed by third-parties so as to be accessible by a communication interface 240, however, other configurations may be possible in other embodiments. The use of stored data in each of these functions whether from memory 205 or external databases 260 is described in greater detail below.

Memory 205 may include a merchant data database 222 that stores information related to one or more merchants. This information may include, e.g., a merchant profile, financial information (such as a financial account information for facilitation of payment from the service provider to the merchant), negotiated information (such as negotiated product or menu availability, delivery times, fulfillment capacity minimum/maximum values, pricing information e.g., in association with a particular product and/or range of products, and the like), products, preferences, categories of products, costs, hours of operation/fulfillment hours, current inventory, and/or activity with the fulfillment server 50 (such as the receipt of information from a merchant device 30). In one embodiment, merchant data 222 also includes a location of a merchant vehicle used for fulfillment of orders the location information being transmitted from a location-determining component of the merchant device 30 via communication interface 52. Merchant data 222 may include information from past orders or transactions with the merchant such as client, number and identification of items purchased, categories of purchased items (include food type, cuisine, restrictions (gluten free, vegetarian, etc.), time/date of purchases, frequency of purchases, purchase prices, and/or client notes stored in association with such transactions. The information in merchant data 222 associated with a merchant's current operating conditions, like current restrictions, capacities, product offerings, prices, availability (or any subset thereof), etc., may be generally understood as merchant records for that particular merchant.

Memory 205 may be configured, in some embodiments, to include a client data database 224 that stores information and metrics related to one or more clients. This information may include a client's profile (such as the client's name, contact information (e.g., email address, mailing address, telephone number, social networks, etc.), date of birth, payment card information (e.g., payment card number, expiration date, cardholder name, security code), information relating to one or more order requirements such as a number of required products (e.g., meals), a day/time of delivery, a delivery address/instructions, a number or percentage of products subject to hard restrictions (e.g., meals subject to dietary restrictions such as gluten free, vegetarian, vegan, allergen free, kosher, or halal meals, forbidden/restricted foods (e.g., specific targeted allergens or religiously-mandated exceptions), etc.), and information relating to client feedback, such as ratings/scores, feedback notes or summaries, survey information, likes/dislikes, or other indications of a client's feedback to a previous order or matched/paired merchant or product. In some embodiments, the feedback may be aggregated or compiled (or is otherwise sufficiently high in granularity) to be reflective of an entire company preference (where the client is a company) and in other embodiments, the feedback may be specific to an individual such as an employee or group of employees of the client. In some embodiments, client preferences may specify a preferred or desired cuisine or product, a size of a meal, and the like. In an embodiment, client data 224 may, in addition to or in alternate to storing a client delivery location, stores a client's current location, as transmitted from a client device 10 via communication interface 240. Client data 224 may include information from past orders or transactions such as matched merchant, number and identification of items purchased, categories of purchased items (include food type, cuisine, restrictions (gluten free, vegetarian, etc.), time/date of purchases, purchase prices, courier information, and/or client notes or feedback stored in association with such transactions. The information in client data 224 associated with a client's current order requirements like number of orders, order date/time, recurrence of orders, delivery location, restrictions, preferences, max price per order, etc., may be generally understood as client records for that particular client.

In some embodiments, memory 205 may store data relating to past orders between one or more clients and one or more merchants in a repository separate from merchant data 222 and/or client data 224 but accessible to optimizer 210. The stored past orders may be pending orders and/or historic orders, and the related orders data may include any of, e.g., client identifier, merchant identifier, courier identifier, fulfillment method identifier, items within order, categories of items/order, date/time of order, client feedback, merchant feedback, courier feedback, price paid by client, price charged by merchant, cost associated with courier, and/or any other appropriate value. Memory 205 may also store data derived from (or derivable from) or based on past transactions, such as profit margin or profit amount of a service provider, frequency of recurring characteristics between orders (e.g., frequency of pairing between client/merchant, or date of last pairing, frequency of matching particular items to a client, or date of last matching), fees/taxes associated with the orders, trends in client feedback relating to a merchant over time, trends in merchant feedback relating to a client over time, trends in order patterns or frequency of clients, overall patterns in feedback or scores of a merchant obtained through aggregated consideration of feedback from one or more customers, or any other relevant calculable value or data. In some embodiments, the memory 205 may store information sufficient to indicate a date-time value at which the customer was last paired with a merchant and/or last delivered a particular item. If this last-paired or last-delivered time is within a predetermined time period of the current time (e.g., within 1 day, 1 week, 2 weeks, or any appropriate value), the fulfillment engine 20 will not implement a restriction against the pairing, or may otherwise weight downward or disincentive the pairing during an optimization process (described in further detail below).

In some embodiments, client constraints 212 and merchant constraints 214 are calculated from current/past orders, merchant data 222 (including the merchant records) and client data 224 (including the client records). As one illustrative example, a set of client constraints for an order may be e.g., Client 1: $15 per plate, 10 plates, including 3 vegans and 1 gluten free. Similarly, an exemplary set of merchant constraints for an order may be Merchant 1: $10 per plate, plates available normal, vegan, gluten free, Kosher, Halal. As discussed earlier, the constraints are calculated for input to the optimizer logic 211.

Merchant data 222 for a particular merchant can be updated by that merchant, via merchant device 30, through remote interfaces such as a website or application software configured to access the fulfillment engine 20 through the network interface 240. Client data 224 may similarly be updated, that is, client data for a particular client can be updated by that client, via client device 10, through remote interfaces such as a website or application software configured to access the fulfillment engine 20 through the network interface 240. Additionally, in some embodiments, updates to merchant data and/or client data may be made by administrators of the fulfillment engine 20 through direct access to the fulfillment engine 20 or through remote access interfaces. In some embodiments, updates to client data 224 and/or merchant data 222 would need to be performed or approved by fulfillment engine administrators. Such updates may include, as an example, changes to pricing details. The processer 250 may in some embodiments need to access remote data from the various merchants 32 and couriers 42 (via devices 30 and 40 respectively) to get updated information about their merchant availability and courier availability.

Control logic 228 and control data 226 provide the necessary logic and data to perform the functions of the fulfillment engine 20, and specifically the functions of the optimizer 210, described further described herein. In some embodiments, memory 205 may also store a scheduler logic 230 that may function to initiate or schedule the functions of the optimizer 210. In other embodiments, the functions of the scheduler logic may instead be performed by the optimizer logic 211, control logic 228, or another component stored in the memory 205.

At a high level, optimizer 210 takes in information such as client constraints 212, merchant constraints 214, merchant-client pair weights 216, profit information 218, analyzes this information in an optimizer function 211 (which may be, in some embodiments, a linear objective function 211), and may output a merchant/client allocation 220. The merchant/client allocation 220 may be an identification of a best or optimized pairing between a particular merchant and a particular client, for fulfillment of a particular client order. In some embodiments, the merchant/client allocation may include the identification of the particular items to include in the order. The function 211 may output such an optimized pairing for each client 12 for whom a pending order must be fulfilled. Optimizer 210 may then arrange for fulfillment of those orders by the merchant specified by the optimized pair. It will be generally understood that the optimizer 210 does not calculate pairs or arrange fulfillment or all future orders continuously, but instead such orders may be grouped and may be executed in batches of future orders or on individual orders as needed or within a reasonable time before the period for delivery of the order is required (to allow sufficient time for preparation and transportation of the order). Collection of current restriction and/or preference information of the client and capacity information of the merchants may happen continuously but the processing of such information through the optimizer may variously be done in advance (scheduled times), by manual activation, or immediately on collection if it is within the reasonable time before the periods of delivery. As one illustrative example, optimizer 210 may be run once, prior to each of three meal periods, breakfast, lunch, and dinner, for all client orders specific to a particular geographic area (e.g., a city, town, campus, building, zip code, neighborhood, or any other appropriate geographic designation) some predetermined period of time in advance. The reasonable time period before the periods of delivery may vary by market and by the nature of the products being delivered (e.g., the day of, 1-3 days in advance of, a week before). In some embodiments, the batching of orders may be done based on delivery time, delivery location, or similar order attributes, and optimizing of orders may be done on such groups some period in advance of when such orders may be delivered. For example, in examples that require merchant approval the optimizer may be run 1-3 weeks in advance to give merchants time to accept or reject such orders. The optimizer may be re-run on orders that were rejected (and possibly orders where merchants failed to respond) allowing the rejected order to be reassigned to other merchants.

FIGS. 3-6 depict flow charts illustrating exemplary processes according to some implementations of the present disclosure. Flow charts 3-6 reference, for purposes of example, components discussed above with respect to FIGS. 1A-2B. Regarding the processes 305-355, 410, 510-560, and 610-630, while the various steps, blocks, or sub-processes are presented in a given order, alternative embodiments can perform routines having steps, or employ systems having steps, blocks or sub-processes, in a different order, and some steps, sub-processes, or blocks can be deleted, moved, added, subdivided, combined, and/or otherwise modified to provide alternative or sub-combinations. Each of these steps, blocks, or sub-processes can be implemented in a variety of different ways. Also, while steps, sub-processes, or blocks are at times shown as being performed in series, some steps, sub-processes or blocks can instead be performed in parallel or in a distributed manner, or can be performed at different times as will be recognized by a person of ordinary skill in the art. Further, any specific numbers noted herein are only examples; alternative implementations can employ differing values, ranges, or components.

Figure 3:
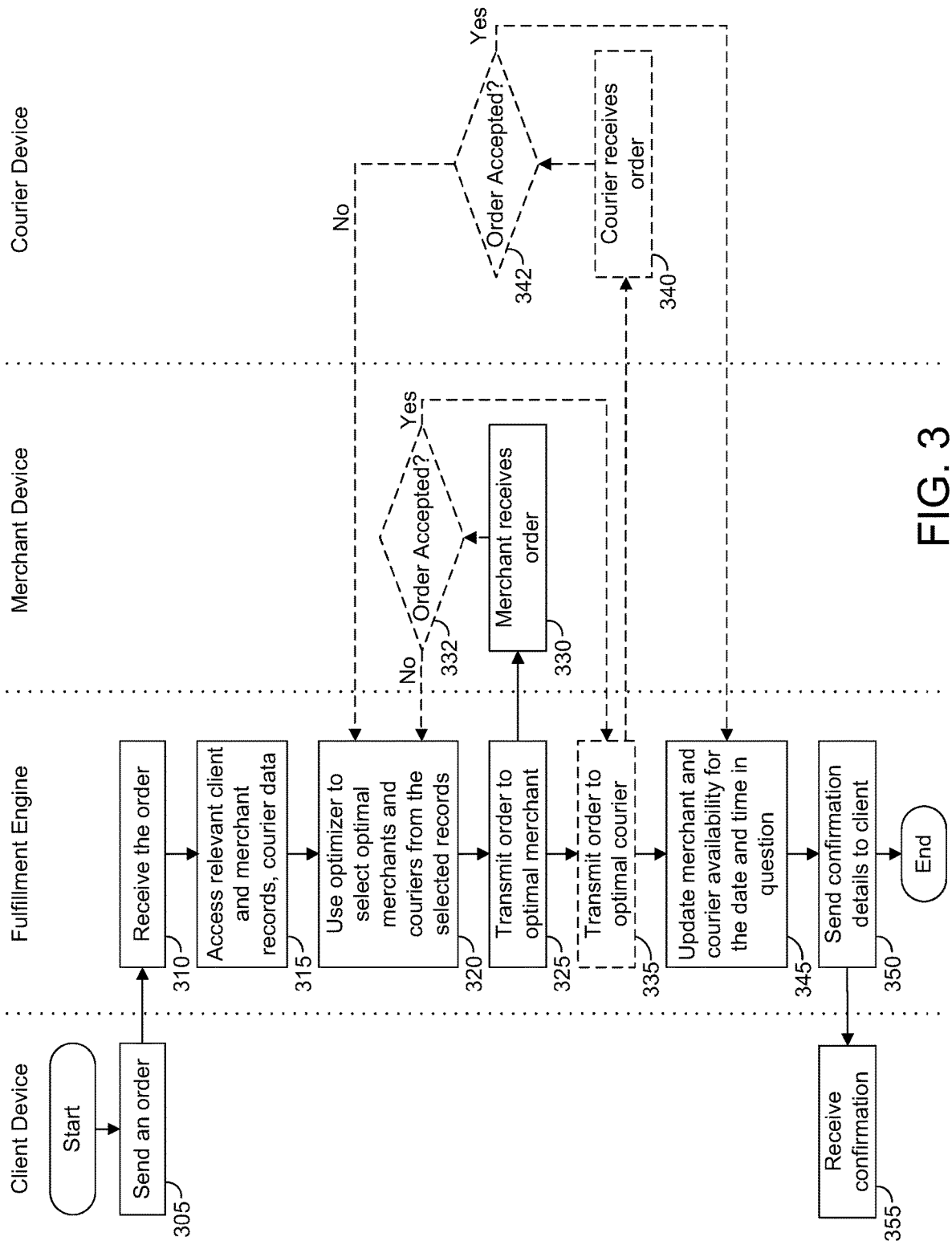
FIG. 3 is a flow chart of an exemplary process for performing a single order fulfillment through an exemplary fulfillment engine.

FIG. 3 illustrates an embodiment of the order fulfillment process, in accordance with some embodiments of the present disclosure. The process begins at step 305, at which the user sends an order from a user device 10, such as a smart phone, tablet computer, or other computer using a special application for the purpose or using a web browser or app. The order does not include an indication of a specific merchant to fulfill the order. The order can be made using a web form, software application, by a structured request, or through the use of natural language by written text or by voice command (e.g. by Alexa, Siri, or Google Assistant). In the case of a natural language order, natural language processing may be applied to determine the user's intent including order restrictions (e.g. vegan, gluten-free, etc.). A confirmation screen may be displayed to the user, to allow the user to confirm the details of the order before the order is sent to the fulfillment engine 20. The order is received by the fulfilment engine 20 at step 310.

At step 315, the fulfillment engine 20 then retrieves relevant client records (from client data 224 and/or client device 10), merchant records (from merchant data 222 and/or merchant device 30), and courier data (from memory 205, external database 260, and/or courier device 40). The client records (or other information obtained from client data 224) may provide information that helps the fulfillment engine optimize fulfillment of the order, such as order information, delivery information, client restrictions, and/or client preferences. In one embodiment, the fulfillment engine may apply order defaults in a case where the order contained no or insufficient details specific to the client, such as restrictions, preferences, delivery location, and delivery instructions. In other embodiments, rather than a default location, the fulfillment server may obtain (or may query the client device 10 for) location information, e.g., GPS data or other location data, that can be used in place of a delivery location.

The merchant records retrieved (or other information obtained from merchant data 222) in step 315 may be restricted by proximity to the client delivery location. For example, in an exemplary embodiment, the fulfillment engine may determine a particular area around the client's delivery location to be an area of proximity, and may filter out, from a comprehensive set of merchant records for all merchants 30 registered with the service provider, the merchants falling outside that area of proximity. Proximity area may be defined, in some embodiments, by a common, already-defined geographic region, such as a city, state, country, neighborhood, campus, or the like. In some embodiments, proximity might be defined by determining which merchants are within a restriction distance of the client, where the threshold distance may be defined by a physical distance (in km or m) between the client delivery location (or current location of the client device) and a location of the merchant from which the order will be fulfillment, stored in merchant records 222 or determined based on a known location of a merchant or a determination of a current location of the merchant device. In other embodiments, proximity may be determined by a calculation of whether one or more of the preparation time of the order and travel time between the merchant and the client is within a threshold value (in minutes). In other embodiments, other methods of determining proximity may be used.

The retrieval of the merchant records may additionally or alternatively be restricted by whether the merchant has sufficient capacity available for the time and date the order is for. In some embodiments, the merchant records may include that information. In other embodiments, the merchant may enter an agreement with the service provider in which specific merchant capacities are defined, and the merchant thereby commits to fulfilling all orders within such capacities. Merchant capacity may be defined by, for example, any or all of a total number of unit products (e.g., meals) the merchant is able to prepare in a single order, a total amount of unit products the merchant is able to prepare in a period of time in aggregation over several orders, a size, load, or weight restriction defined by a merchant vehicle or courier vehicle, restrictions set by regional regulations (such as limitations on the transportation of types or amounts of products), a maximum number of unit products the merchant can prepare due to ingredient or part limitations, restrictions set by merchant hours or availability, staffing limitations, circumstantial limitations (such as weather, power, supply) that may limit merchant production, or any other factor that may impact a merchant's minimum or maximum capacity.

Merchant records may include the merchant's catalog, pricing information such as price per item, capacity schedule, location, and so forth. In some embodiments, the merchant records capacity schedule includes a number available to the system 20 for allocation, but in other embodiments, this is just a maximum. In such embodiments, the system 20 may query the merchants 32 for their available capacity as part of step 315. Alternatively, updated capacity and availability information can be transmitted from time to time (e.g., on a scheduled, periodic, or recurring basis, or through one-time or unscheduled pushes of data) from one or more of the various merchants 32 to the fulfillment engine 20.

Client-merchant ratings may be included in the client records, merchant records, or separately stored in the memory 205. The rating associated with the client may also be obtained. The merchant's catalog and the client's order restrictions may also be compared to ensure the merchant is capable of filling the order. The location of the merchant may also be compared with the client order delivery location and relevant courier records to ensure the merchant is in range for delivery to the client. The resulting records of the client, merchants, and couriers are fed with the client order into the optimizer, at step 320, which returns an optimal restaurant and courier pairing that can be used by the fulfillment engine 20 to fulfill the order. In some embodiments, only the most optimal pairing is returned. In other embodiments an ordered list of the most optimal pairings are returned in order of optimality.

At step 325 the order (or information about the order, such as the order items, destination, and/or delivery date/time) is sent to the merchant 32. At step 330, the most optimal merchant 30 receives the order. Step 332 involves a decision by the merchant as to whether it accepts the order. In some embodiments, the merchant 32 is under contract to be able to produce a certain number of items for the fulfillment engine 20. In this case, the merchant 32 would only reply to the fulfillment engine 20 with a confirmation message (Yes, in response to step 332). In other embodiments the merchant may reply with a confirmation message (Yes, in step 332) or an error, denial, request for additional information, or any response other than an acceptance (No, in step 332), based on whether the merchant 32 determines that it is able to fulfill the terms of the order. In case of an error, merchant availability (merchant data 222) is updated with the error message and control is either returned to step 320 for another merchant to be selected.

In some embodiments, in step 320, the optimizer, rather than a single merchant-client pair, may provide a ranked or ordered list of merchant-client combinations for a single client, ranked/ordered based on how optimal the pairing is. That is, as an example, if either of merchants A, B, or C can fulfill an order for a client, with A being the most optimal, and B and C being increasingly less optimal, the optimizer may, in step 320, return the following result: $\{1, A\}$, $\{1, B\}$, $\{1, C\}$. Other embodiments may provide different configuration or format of the optimizer results. If multiple suitable merchants were returned in such an embodiment, the next optimal merchant is tried, as the process cycles back to step 325, and the order (or order information) is transmit to that next optimal merchant. This process continues until either all the merchants have been tried and failed or that a merchant has confirmed acceptance of the order. Depending on the nature of the order's rejection, the merchant's availability may be updated to reflect the order's rejection for this period. If all merchants failed to accept, the order control would return to 320 for a new list, i.e., the optimizing function is re-run with different inputs. Inputs may differ, for example, by changing information such as proximity to the client, the service proximity's profit margin, reducing or lowering the weight of client preference, or any other appropriate modification.

In the embodiment of FIG. 3, a merchant has confirmed acceptance of the order but does not provide its own delivery, therefore, control passes to Step 335 to send an order to an optimal courier (step 340) for delivery of the order. Other configurations may be possible in other embodiments, for example, where the merchant provides delivery fulfillment and no third party courier is needed. The courier may also determine its availability to fulfill the order at step 342, and if not available (No in step 342), the process cycles back to step 320 and the order is transmitted to the next most optimal courier (or in some cases, the next most optimal merchant if no courier is available). If the courier confirms available (Yes in step 342), the process continues to step 345.

At step 345, the merchant 32 and courier 42 availability is updated for the date and time in question. Control is then passed to step 350, which sends an order confirmation to the client device 10 as long as a merchant and courier has been confirmed. In some embodiments, one or more merchants are obligated to set aside a fixed number of product for the service provider. Additionally, the merchants may handle delivery or clients may pick up the order. In these cases, receiving confirmation may be optional and hence are shown with dotted lines.

Figure 4:
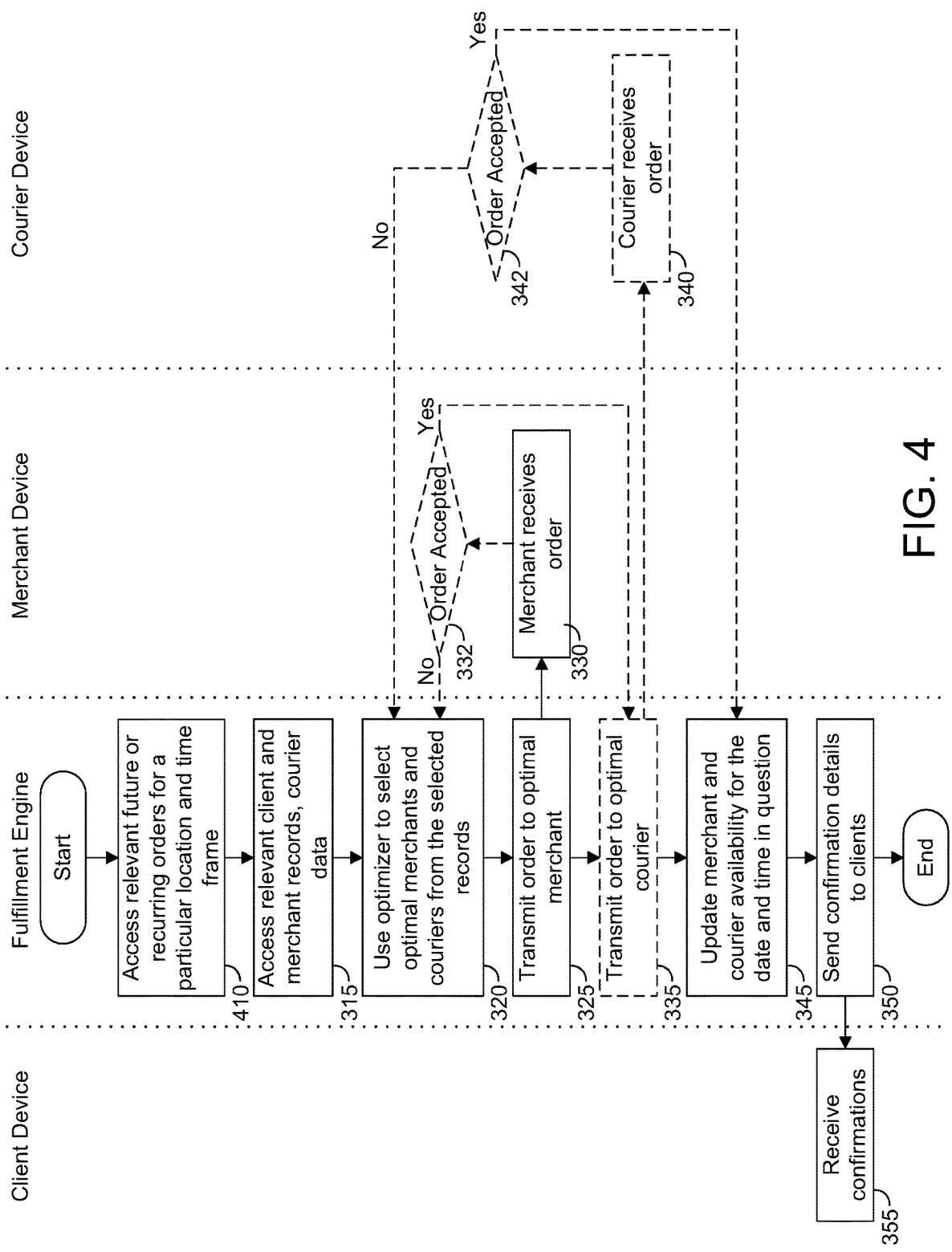
FIG. 4 is a flow chart of an exemplary process for performing a multiple orders fulfillment through an exemplary fulfillment engine.

Allocating orders individually allows for an optimization of each order but may not give an optimal allocation for larger sets of orders over a specific period because later processed orders might not be able to be filled or at least not filled optimally because of earlier processed orders, which may have been more flexibly filled. For example, a number of different clients may place advance orders for fulfillment at the same (or relatively close times). In one embodiment, where the service provider is a catering service, each client company may have (new or preexisting) a lunch order on a single day, each order for multiple meals. Exemplary FIG. 4 illustrates a similar process as FIG. 3, but in the case of FIG. 4, the process is for a group of future or recurring orders for a particular day/time instead of a single, one-time order that has been received previously. The process of FIG. 4 may begin in Step 410 by accessing all orders for the particular time or optionally only orders limited to a particular location are accessed at the same time. After this step, the process followed in largely similar to that of FIG. 3, and accordingly, where process similar as described in the discussion of FIG. 3, the same reference numbers are used in both FIG. 3 and FIG. 4. Step 315 is to load all relevant records for use by the optimizer 210. Less filtering may be performed in this example of FIG. 4 as the details may already be entered in as variables or constraints for the optimizer where similar previous orders have been placed. Step 320 works as outlined earlier except multiple orders are entered all at once. By processing all the orders at the same time, the optimizer is able to find allocations that are optimal across all orders or at least as many orders as possible. In an exemplary embodiment, the processing of multiple orders simultaneously is the normal operation of the optimizer, though other types of operation may be possible in other embodiments. In some embodiments, single order processing generally only occurs for late or same day submissions or for last minute changes, or for preliminary orders, test-runs or pilots, special or temporary events, and the like. Steps 325, 330, 335, 340, 345, 350, and 355 work the same as described above for FIG. 3 but for multiple orders. Additionally for Steps 325, 330, 335, and 340, orders for multiple clients going to the same merchant 30 or courier 40 may be grouped together in the same transmission initially as large orders indicating how they are to be subdivided. If the larger order is rejected due to capacity issues, the orders may be submitted to the merchant individually.

Figure 5:
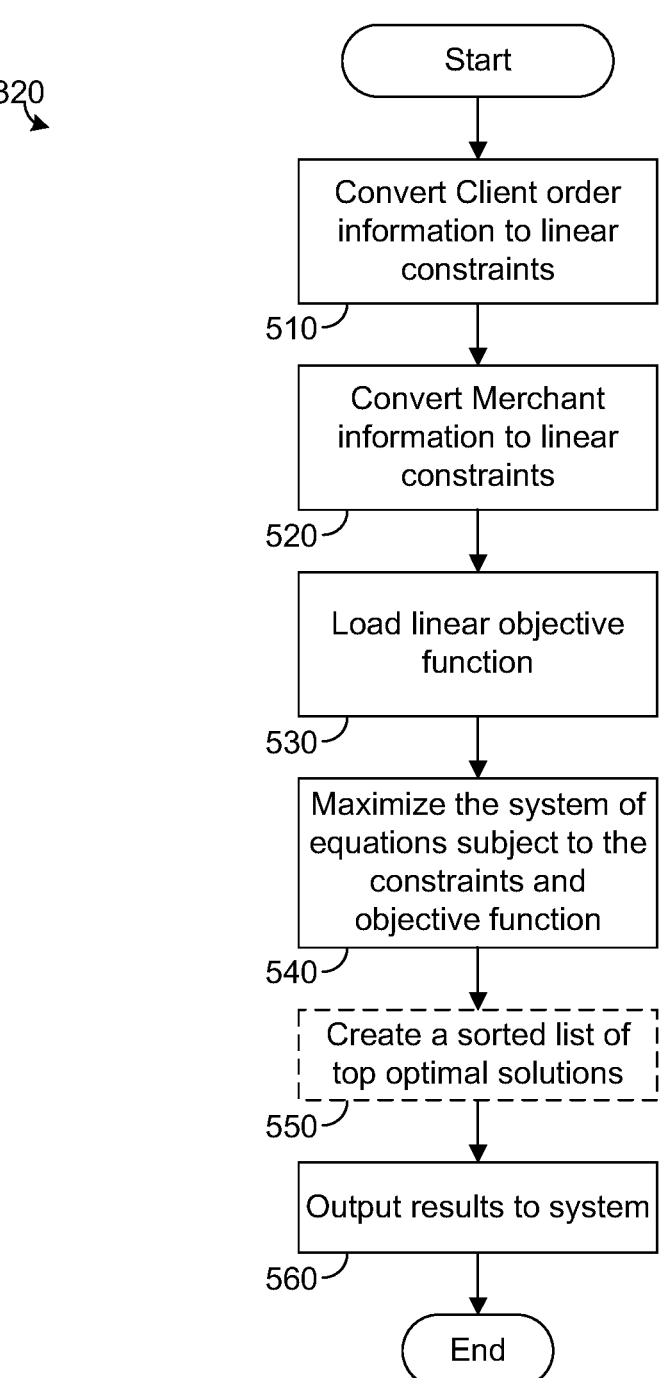
FIG. 5 is a flow chart of an exemplary process of allocation optimization.

Step 320 in both FIG. 3 and FIG. 4 involves the use of an optimizer 210 to assign or allocate client orders to merchants. This optimization could be performed in different ways including machine learning systems or through linear programing methods. FIG. 5 illustrates an exemplary process of a merchant client optimizer.

In the example of FIG. 5, the optimizer solves the allocation problems of assigning client orders to merchants 30 by use of one or more linear programming methods. In Step 510, the optimizer converts client order information to linear constraints. In one exemplary embodiment, the following equation may be used:

$$\text{(Equation 1)}$$

$$\text{Income}_{client} =$$

$$PricePerPlate_{client} \times PlatesOrdered_{client} \ \& \ PlatesOrdered_{client} \geq Y$$

where Y is the size of client's order. Equation 1 references only a small number of constraints, and any appropriate client order constraints may be used in different embodiments. For example, client constraints may include any or all of a number or percentage of products subject to hard restrictions (e.g., meals subject to dietary restrictions such as gluten free, vegetarian, vegan, allergen free, kosher, or halal meals, forbidden/restricted foods (e.g., specific targeted allergens or religiously-mandated exceptions), etc.), and restrictions arising from information relating to client feedback, such as ratings/scores or feedback indicating that a previously-matched order or merchant or product should not be used.

In step 520, merchant information is converted to linear constraints. In one exemplary embodiment, the following equation may be used:

$$cost_{merchant} = PricePerPlate_{merchant} \times PlatesOrdered_{merchant} \ \& \ \text{(Equation 2)}$$

$$PlatesOrdered_{merchant} <= PlateCapacity_{merchant}.$$

Equation 2 references only a small number of constraints, and any appropriate merchant order constraints may be used in different embodiments. For example, merchant constraints may include any or all of a product or menu availability, delivery times, fulfillment capacity minimum/maximum values, hours of operation/fulfillment hours, current inventory, restrictions set by merchant hours or availability, staffing limitations, circumstantial limitations (such as weather, power, supply) that may limit merchant production, or any other appropriate value.

In Step 530, a linear objective function is loaded. In one exemplary embodiment, the following equation may be used:

$$\text{(Equation 3)}$$

$$0.5 \times \text{Profit} + 0.3 \times ClientSatisfaction + 0.2 \times MerchantSatisfaction$$

where ClientSatisfaction is a function of the client's previous positive or negative ratings for the particular merchant, client preferences relative to the perspective merchant and merchant's catalog, and an optional variety score. When processing multiple orders as in FIG. 4, the linear objective function would seek to maximize the objective functions for all clients.

The objective function is a composite computation that makes a tradeoff between factors such as client satisfaction, profit margin, restaurant satisfaction, and assigns weights thereto. Weights are assigned by the catering service provider, in a preferred embodiment, based on the business interests of the service provider, though in other embodiments, weights may be set by default, or by other mechanic or purpose. In some embodiments, the linear objective function may be calculated by the following exemplary equation:

$$\sum_{i=1}^{z} (w_1 a_1 + w_2 a_2 + \ldots + w_n a_n) \qquad \text{(Equation 4)}$$

where z is the number of client orders being processed, $a_1$ through an are factors that should be optimized upon (such as client restrictions and/or preferences, merchant restrictions, and service profit profits), and $w_1$, $w_2$, . . . $w_n$ are respective weights assigned to those factors.

As one illustrative example, with reference to Equation 4, factor $a_1$ might reflect an actual (or in some cases predicted, average, or representative) amount of profit the service profit expects to make from the meal, given a flat cost paid by the client to the service provider per meal, and a flat or varying cost paid by the service provider to the merchant per meal. Factor $a_2$ might reflect, for example, a client's satisfaction, e.g., by the accommodating of one or more restrictions (such as, 5 gluten-free meals of 20 meals total). Factor an might reflect, for example, a merchant satisfaction, e.g., by the accommodating of one or more restrictions, such as a 30 meal maximum capacity for a lunchtime order. While these example factors have numeric values, a factor need not be inherently numeric, and instead, may be assigned a corresponding number.

As shown in Equation (4), a weight (of weights $w_1$, $w_2$, . . . $w_n$) may be applied to a factor an. A weight may be any value, positive or negative, a positive weight causing a factor an to contribute positively to the optimization result, and a negative weight contributing negatively. In one embodiment, weights $w_1$, $w_2$, ... $w_n$ range from $-1$ to $+1$, however, in other embodiments, the values may range from $0$ to $+1$, or may not be so limited. For example, where factors $a_1$ through $a_n$ are as described above, and where $w_1$ is 0.5, $w_2$ is 0.3, and $w_n$ is 0.02, it will be understood that factors $a_1$ (service provider profit), $a_2$ (customer satisfaction) and $a_n$ (merchant satisfaction) contribute positively to the calculation to varying degrees. The above examples are of course merely for purposes of explanation, and any appropriate factor, weight value, and/or corresponding numbers may be assigned in different embodiments, based on the information available from memory 205. In the above example, the linear objective function may, for example, take the following form:

$$\sum_{i=1}^{z} 0.5 \times \text{Profit} + 0.3 \times \text{CustomerSatisfaction} + 0.2 \times \text{MerchantSatisfaction}$$ (Equation 5)

where z is the number of client orders being processed. In other embodiments the weighting assigned to the profit, client satisfaction, or merchant satisfaction may be changed to assign the optimizer different priorities for each of these functions (e.g., 0.2×Profit+0.5×ClientSatisfaction+0.3×MerchantSatisfaction, 0.2×Profit+0.4×ClientSatisfaction+0.4×MerchantSatisfaction, or 0.3×Profit+0.3×ClientSatisfaction+0.3×MerchantSatisfaction).

User-merchant pairing information, which indicate among other things a rating information, service dates, and service frequency information, can stored in the memory 205. The ratings can take the form of positive or negative ratings, a star system (e.g., 4 star, 5 star, or 10 stars), survey results, or so forth. This paring information can be used to in the calculation of a customer satisfaction score for the optimizer.

As clients 12 or their employees send in feedback, this information is stored and tabulated in client data 224. This information may be compiled, considered individually or in aggregate, and/or otherwise analyzed or processed, and may be applied to the calculation of the client satisfaction score so as to either increase or decrease the likelihood that a particular merchant 32 will be allocated to a client's order in the future based on if the rating is positive or negative respectively. If a client indicates that a merchant should not be used again the fulfillment engine 20 can look at any future orders of the client 12 to make updates and changes as necessary. If there is sufficient time available, an update may simply be to cancel the order if that merchant is assigned to fill the clients order in the future and to allocate another merchant. Alternatively or if there is not enough time to cancel the order, the fulfillment engine can look for similar orders by other clients and run a optimizer analysis against them to see if the orders may be switched between different clients future orders. For example, if there are two orders going to two different clients that have similar restrictions and preferences and it is too later to cancel the one order, the fulfillment engine 20 may update the courier information and order times to deliver one order to the other client and vice versa. These updates can be calculated to make the smallest possible changes to the orders to make the switch happen.

A variety score or indicator can be used, as a factor in the optimization analysis, in those embodiments where there is a preference to use different merchants to keep client's experience fresh and appealing. The variety indicator could be used as a weighting that can be increased by a specified amount every time a particular merchant is used. The variety indicator can, in some embodiments, be set to decrease either over time or after other merchants are allocated to that client or a combination of the two. The application of the variety score may influence the optimizer to vary the merchants allocated to a particular clients order. In some instances, this may allow the merchant to be reused over time. The increase factor, the decrease factors, and/or score multiplier can be configured on a per client basis, as some clients will value variability differently than others.

Steps 510, 520, and 530 can be performed in any particular order. Additionally instead of converting the values to linear equations every time the optimizer runs the linear equations may be stored by the optimizer or in a database only requiring conversion when the values change. In Step 540, the system solves the system of equations and finds the values that maximize the objective function based on the given constraints. Optionally, at step 550 a sorted list of the most optimal pairings can be returned for each order rather than simply the most optimal pairings. This would allow for alternate selections in the event a merchant's availability has changed since the last time the merchant's availability was checked (see FIG. 3, steps 325 and 330). At step 560, the results are output to the fulfillment engine 20.

Depending on the number of orders expected to be processed for a particular period and the amount of computing power available, some embodiments of the optimizer 210 may consider simplifying the allocation problem before executing the optimizing logic. Simplifying the business model can also in turn simplify the linear programing approach. As one illustrative example, in the catering scenario, the catering service provider can contract with each merchant for a single per plate price for every meal and every order made by the fulfillment engine to that particular merchant (e.g., merchant A charges X per plate, and merchant B charges Y per plate). In some embodiments, running the optimizer first on a subset of orders containing restriction against the set of merchants able to meet those restrictions can be helpful in simplifying the problem. More particularly, the reduction or filtering of merchants prior to executing the linear programming logic simplifies the number of edges that must be considered in an optimization algorithm. The merchant capacities may in those be embodiments be updated before executing the optimizer with the rest of the orders.

In an alternative embodiment, the optimization of allocation is performed by one or more machine learning algorithms using a series of weights representing one or more of user feedback, variety indicators, and the factors already enumerated for the linear programming method. In one example, a machine learning algorithm may be trained in whole or in part on past orders placed by one or more clients, where similarities in client, merchant, restriction, cuisine, and the like may exist, and/or on past customer feedback.

In some situations, client orders may be too large or too complicated for any particular merchant to fill the order. In such cases, the fulfillment engine 20 may break up client orders into smaller order to make fulfillment easier. Additionally, in cases where using a varying or set plurality or assortment of merchant sources for fulfillment is preferable (e.g., regular or recurring catering), an embodiment is contemplated where, if less than a threshold number of merchants are able to fill the order, the order may be broken up potentially with a minor penalty when serviced by multiple merchants.

Figure 6:
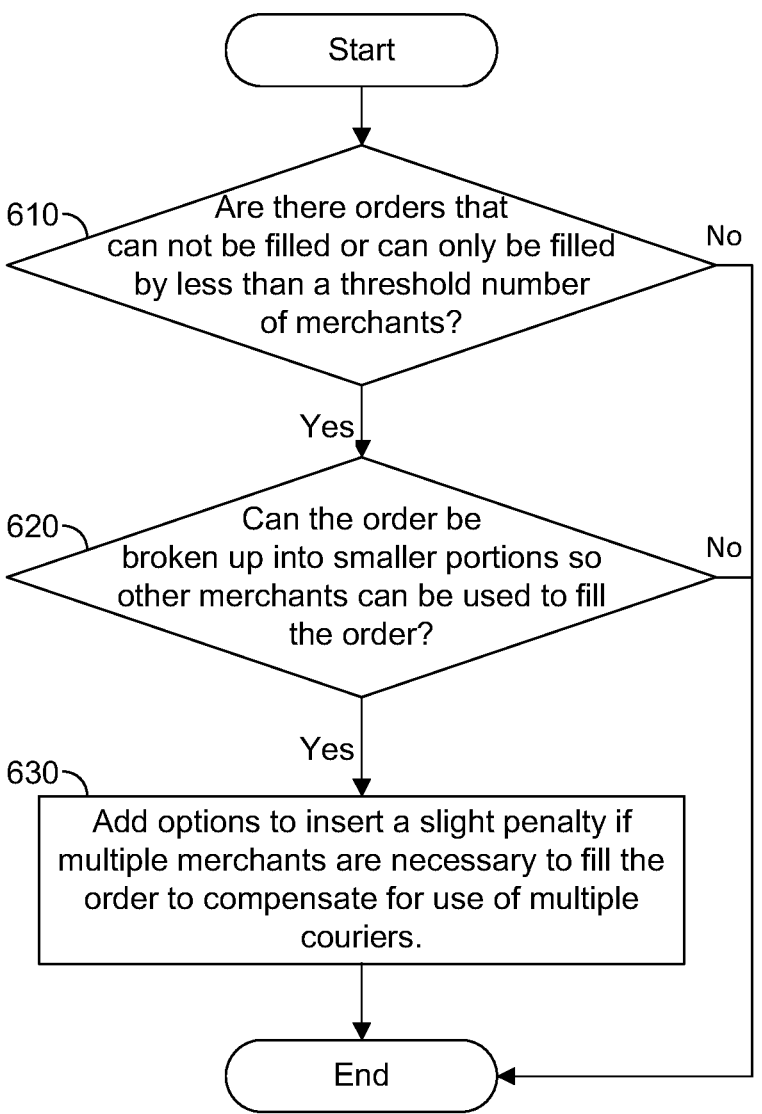
FIG. 6 is a flow chart of an exemplary order division.

In the exemplary embodiment of FIG. 6, the engine 20 can handle such situations by first identifying when an order cannot be filled or when less than a threshold number of merchants can handle the order, as shown at step 610.

At step 620, the engine 20 will determine a convenient way to break up the client order. Such as if the order was flagged for complexity, the engine 20 will try to break up the order into less complex orders. For example in the catering space, if the order requires appetizers, salads, entrees, and desserts the system can break all (or any subset) of them up into separate orders. In some embodiments, the fulfillment server runs an optimizing function for each separate order separately. In some embodiments, all of some of the instances of the optimizing function can be run in parallel, and in others, they may be run serially. If the order is flagged because it is too large for fulfillment by a single merchant, it can simply be broken into two (or any number of) smaller orders (e.g., two half orders or four quarter orders). The fulfillment engine can be set to break up orders by size of the merchant's capacities, by a set number, or by a set percentage as an example. At step 630, slight penalty weightings are added to the optimizer's objective function to incentivize serving the order with smaller number of merchants, though other embodiments may exist where no penalties are applied.

User interfaces for the client devices 10, merchant devices 30, and courier devices can take many forms. For example, FIG. 7A illustrates an exemplary ordering screen 700 displayed on a client device 10. An ordering screen might have a header 710, fields 715 for collecting necessary information such as a delivery address, delivery time, and/or a start or delivery date. The fields 715 may use widgets such as maps, clocks, and calendars respectively to help the client 12 enter the appropriate information using a touch screen, mouse, or keyboard. For returning clients with standing or future orders, such a screen could be used to edit the standing or future order and be pre-populated with the existing information. The client 12 may then indicate if this is a one-time, daily, or weekly order. If a weekly order is selected additional controls 730 may be displayed or enabled to allow the client to select additional information such as which days the weekly order should be delivered on. Order information 740 allows the client 12 to select how many meals should be provided with each order. It also allows for the entry of dietary restrictions. As dietary restrictions are entered, additional lines may become available for entering more restrictions and how many meals of each particular restrictions are requested. Possible dietary restrictions include but are not limited to gluten-free, vegan, nut allergies, pescatarian, dairy-free, etc. all or some combinations thereof may be made available for selection. An 'Other' option may available for clients to select, which would enable clients to enter in additional information special dietary requirements Such entries may require manual handling from the fulfillment engine 20 or may be highlighted to merchants fulfilling the order to see if it is an option that they are able to fulfill. The client 12 may place the order by selecting the 'Order' button. As shown in FIG. 7B, if the order is confirmed by the fulfillment engine 20, as discussed earlier, an order confirmation screen 750 may be displayed on screen 750 or otherwise transmitted to the client device 10. The order confirmation may be returned in real-time immediately or later by way of notifications or through email or other messaging services.

Figures 8A, 8B:
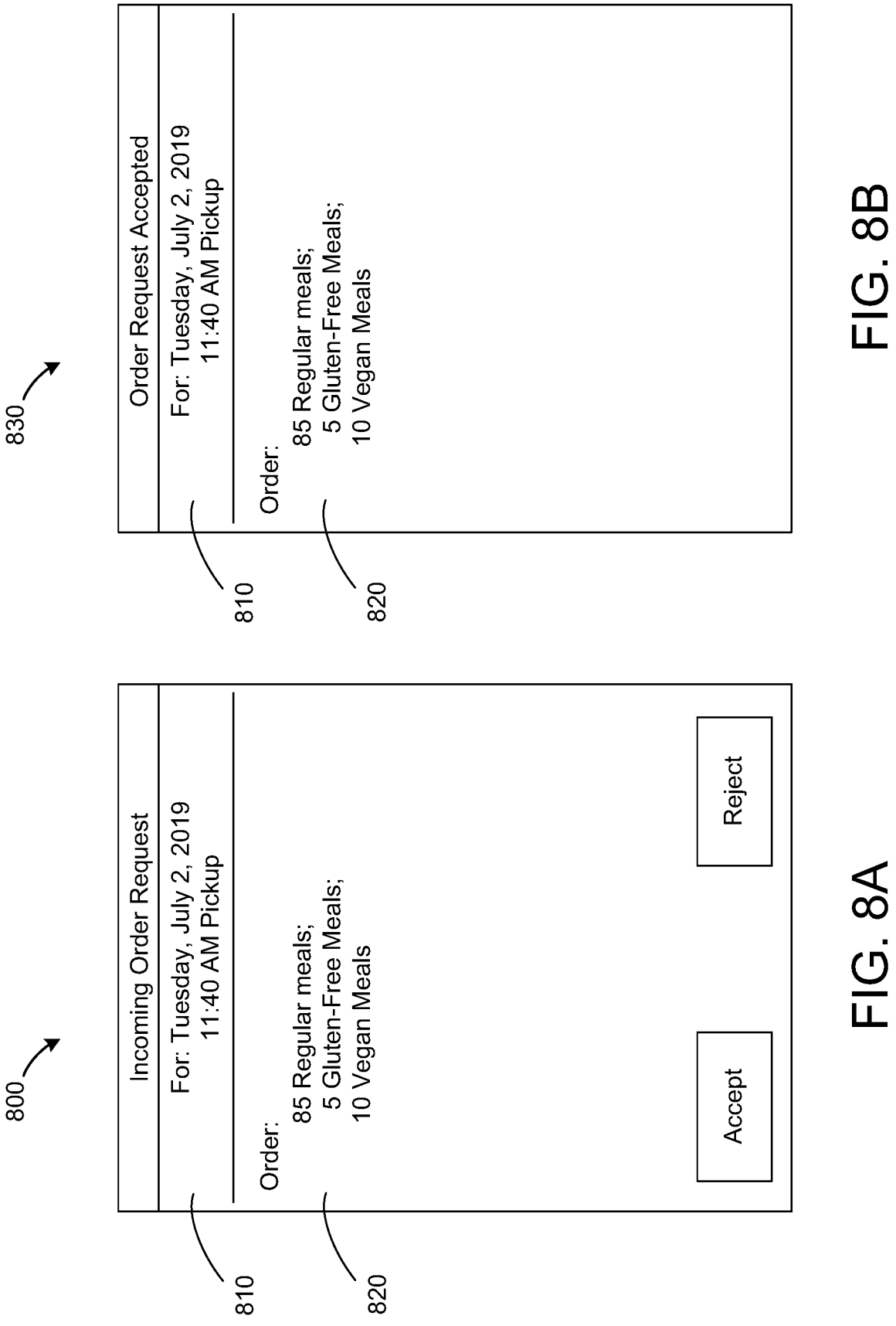
FIG. 8A is a merchant user interface display for the accepting or rejecting of client orders.
FIG. 8B is a merchant user interface display confirming the acceptance of client orders.

Merchant devices 30 in some embodiments may have options for manual order acceptance. This can occur if the merchant's order processing system is not compatible or configured to work automatically with the fulfillment engine 20 or in situations where a special order has been made which requires special handling (e.g. other dietary restriction selection). As shown in FIG. 8A, in such situations an incoming order request screen 800 may be displayed. The displayed order date and pickup time 810 are adjusted to compensate for estimated traffic and a predetermined pick up and drop off offsets. The pickup offset may vary from merchant to merchant to compensate for the average time needed for a courier to pick up an item for shipment (e.g. merchants with difficult parking arrangements might have a pickup offset to compensate for extra time a courier would need to pick up from that location). Similarly, the drop off offset may vary from client to client to compensate for how much uploading time may be required for a particular client. The order information is displayed in the order section 820. The merchant 32 may in this case accept or reject the order for example by using the associated buttons on the bottom of the screen. In FIG. 8B, a display 830 is shown in the event that the merchant has accepted the order. In the event that the merchant accepts an order acceptance screen 830 may be displayed as shown in FIG. 8B.

Courier devices 40 in some embodiments have a user interface for accepting incoming courier requests 900 as shown in FIG. 9A. The incoming courier request interface 900 may provide a lot of useful information to help couriers determine whether the courier is willing and able to provide pickup and deliver the order. Such information may include the time and date of the pickup 910, the time and location of the pickup 920, the time and location of the delivery 930, the order detail 940, and/or a map from the pickup location to the delivery location including an estimated travel time 950. The order details 940 on the courier display 900 may include details to help the courier better understand the size requirements of the courier job (e.g. that there is 100 meals in 8 chaffing dishes and 3 medium sized boxes). In other embodiments, the order information 940 may include dimensions, weight, number of parcels, and so forth. The order information may also include a details option made viewable by button, hyperlink, or hover action. If the courier 42 accepts the courier request, a courier confirmation screen 960 such as that shown in FIG. 9B may be displayed.

While much of the discussion of the fulfillment engine 20 has been discussed in view of catering the principles described herein can be applied to other type of order fulfillment scenarios that allow for vague and fungible ordering as discussed earlier. In the example, many steps were described. Often these steps can be performed in different orders, multiple steps might be combined with into single steps, or single steps might be broken up in to multiple steps with the same results and within the spirit of this disclosure.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The invention claimed is:

1. A method including optimizing allocation of a plurality of standing orders to a plurality of fulfillment entities, the method comprising:

training a machine learning algorithm in a fulfillment system using data from past orders and a series of weights including a first weight associated with user feedback, a second weight associated with a fulfillment entity restriction, and at least a third weight associated with a client restriction;

receiving, by the fulfillment system from rendered user interfaces of a plurality of client devices, a plurality of standing orders, wherein each of the plurality of standing orders does not specify any particular item making up the order and does not include an indication of a fulfillment entity from which to source items for the standing order;

accessing, from a memory, by the fulfillment system, a plurality of fulfillment entity records, each the fulfillment entity record comprising information regarding at least one of the following fulfillment attributes:

(a) an item offered by the fulfillment entity, and (b) a location of the fulfillment entity;

accessing, from the memory, by the fulfillment system, user records associated with a plurality of standing orders, each user record comprising information including at least one of the following ordering attributes of a user associated with the standing order:

(i) disinclination toward certain items, (ii) preference to certain items, (iii) delivery location, and (v) delivery time for the items;

accessing, from the memory by the fulfillment system, courier data for a plurality of couriers;

inputting the plurality of fulfillment entity records, the user records, and the courier data into the trained machine learning model;

outputting, by the trained machine learning model, optimal fulfillment entity and courier combinations for each of the standing orders;

creating, by the fulfillment system, fulfillment requests for the standing orders using the optimal fulfillment entity and courier combinations;

transmitting, by the fulfillment system, the fulfillment requests for the standing orders to fulfillment entity devices of the fulfillment entities in the fulfillment entity and courier combinations; and transmitting, by the fulfillment system, order details associated with the standing orders to courier devices of the couriers in the fulfillment entity and courier combinations, each order detail including a map showing a location of the fulfillment entity of a fulfillment entity and courier combination, and a location of a client associated with the standing order, and a route from the location of the fulfillment entity to the location of the client, wherein the couriers physically deliver the orders from the location of the fulfillment entities to the locations of the clients according to the routes.

2. The method of claim 1, wherein the machine learning algorithm is a neural network.

3. The method of claim 1, wherein the courier data comprises data received from GPS receivers in the courier devices.

4. The method of claim 1, wherein the courier data comprises data received from GPS receivers in the courier devices, and wherein the fulfillment system tracks locations of the couriers using the data received from the GPS receivers.

5. The method of claim 1, wherein the series of weights further comprises a fourth weight associated with a number of times that a fulfillment entity is used by a client.

6. The method of claim 1, wherein the fulfillment system receives at least one instance of user feedback regarding a previous item fulfillment, and wherein the method further comprises:

changing, by the fulfillment system, allocation of user orders to fulfillment entities in accordance with the received at least one instance of user feedback.

7. The method of claim 1, further comprising:

physically delivering the orders from the location of the fulfillment entities to the clients according to the routes.

8. The method of claim 1, wherein the series of weights further comprises a fourth weight associated with fulfillment entity-client pairs.

9. The method of claim 8, wherein the machine learning algorithm is a neural network.

10. The method of claim 1, further comprising:

physically delivering, using vehicles, the orders from the location of the fulfillment entities to the clients according to the routes.

11. A fulfillment system comprising:

at least one processor;

at least one memory coupled to the at least one processor, the at least one processor being configured to execute instructions stored in the memory to perform steps comprising:

training a machine learning algorithm running using data from past orders and a series of weights including a first weight associated with user feedback, a second weight associated with a fulfillment entity restriction, and at least a third weight associated with a client restriction:

receiving, by the fulfillment system from rendered user interfaces of a plurality of client devices, a plurality of standing orders, wherein each of the plurality of standing orders does not specify any particular item making up the order and does not include an indication of a fulfillment entity from which to source items for the standing order;

accessing, from the memory, by the fulfilment system, a plurality of fulfillment entity records, each the fulfillment entity record comprising information regarding at least one of the following fulfillment attributes:

(a) an item offered by the fulfillment entity, and (b) a location of the fulfillment entity;

accessing, from the memory, by the fulfillment system, user records associated with a plurality of standing orders, each user record comprising information including at least one of the following ordering attributes of a user associated with the standing order:

(i) disinclination toward certain items, (ii) preference to certain items, (iii) delivery location, and (v) delivery time for the items;

accessing, from the memory by the fulfillment system, courier data for a plurality of couriers;

inputting the plurality of fulfillment entity records, the user records, and the courier data into the trained machine learning model;

outputting, by the trained machine learning model, optimal fulfillment entity and courier combinations for each of the standing orders;

creating, by the fulfillment system, fulfillment requests for the standing orders using the optimal fulfillment entity and courier combinations;

transmitting, by the fulfillment system, the fulfillment requests for the standing orders to fulfillment entity devices of the fulfillment entities in the fulfillment entity and courier combinations; and transmitting, by the fulfillment system, order details associated with the standing orders to courier devices of the couriers in the fulfillment entity and courier combinations, each order detail including a map showing a location of the fulfillment entity of a fulfillment entity and courier combination, and a location of a client associated with the standing order, and a route from the location of the fulfillment entity to the location of the client, wherein the couriers physically deliver the orders from the location of the fulfillment entities to the clients according to the routes, wherein the couriers physically deliver the orders from the location of the fulfillment entities to the locations of the clients according to the routes.

12. The fulfillment system of claim 11, wherein the machine learning algorithm is a neural network.

13. The fulfillment system of claim 11, wherein the courier data comprises data received from GPS receivers in the courier devices.

14. The fulfillment system of claim 11, wherein the courier data comprises data received from GPS receivers in the courier devices, and wherein the fulfillment system tracks locations of the couriers using the data received from the GPS receivers.

15. The fulfillment system of claim 11, wherein the series of weights further comprises a fourth weight associated with a number of times that a fulfillment entity is used by a client.

16. The fulfillment system of claim 11, wherein the processor receives at least one instance of user feedback regarding a previous item fulfillment, and wherein the processor is further configured to execute instructions to perform steps comprising:

changing, by the processor, allocation of user orders to fulfillment entities in accordance with the received at least one instance of user feedback.

17. A system comprising:

a fulfillment system comprising:

at least one processor;

at least one memory coupled to the at least one processor, the at least one processor being configured to execute instructions stored in the memory to perform steps comprising:

training a machine learning algorithm running using data from past orders and a series of weights including a first weight associated with user feedback, a second weight associated with a fulfillment entity restriction, and at least a third weight associated with a client restriction:

receiving, by the fulfillment system from rendered user interfaces of a plurality of client devices, a plurality of standing orders, wherein each of the plurality of standing orders does not specify any particular item making up the order and does not include an indication of a fulfillment entity from which to source items for the standing order;

accessing, from the memory, by the fulfilment system, a plurality of fulfillment entity records, each the fulfillment entity record comprising information regarding at least one of the following fulfillment attributes:

(a) an item offered by the fulfillment entity, and (b) a location of the fulfillment entity;

accessing, from the memory, by the fulfillment system, user records associated with a plurality of standing orders, each user record comprising information including at least one of the following ordering attributes of a user associated with the standing order:

(i) disinclination toward certain items, (ii) preference to certain items, (iii) delivery location, and (v) delivery time for the items;

accessing, from the memory by the fulfillment system, courier data for a plurality of couriers;

inputting the plurality of fulfillment entity records, the user records, and the courier data into the trained machine learning model;

outputting, by the trained machine learning model, optimal fulfillment entity and courier combinations for each of the standing orders;

creating, by the fulfillment system, fulfillment requests for the standing orders using the optimal fulfillment entity and courier combinations;

transmitting, by the fulfillment system, the fulfillment requests for the standing orders to fulfillment entity devices of the fulfillment entities in the fulfillment entity and courier combinations; and transmitting, by the fulfillment system, order details associated with the standing orders to courier devices of the couriers in the fulfillment entity and courier combinations, each order detail including a map showing a location of the fulfillment entity of a fulfillment entity and courier combination, and a location of a client associated with the standing order, and a route from the location of the fulfillment entity to the location of the client, wherein the couriers physically deliver the orders from the location of the fulfillment entities to the locations of the clients according to the routes; and a plurality of courier devices in communication with the fulfillment system.

18. The system of claim 17, wherein the series of weights further comprises a fourth weight associated with fulfillment entity-client pairs.

19. The system of claim 18, wherein the machine learning algorithm is a neural network.

20. The system of claim 17, further comprising:

a plurality of client devices in communication with the fulfillment system.

* * * * *